(12) United States Patent
Akiba et al.

(10) Patent No.: US 11,501,540 B2
(45) Date of Patent: Nov. 15, 2022

(54) IMAGING SYSTEM AND OBJECT IDENTIFYING APPARATUS TO BE MOUNTED IN VEHICLE, AND OBJECT IDENTIFYING METHOD TO BE EMPLOYED BY VEHICLE

(71) Applicant: DENSO CORPORATION, Kariya (JP)

(72) Inventors: Kazuyoshi Akiba, Kariya (JP); Toshikazu Murao, Kariya (JP); Kazuhiko Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 553 days.

(21) Appl. No.: 16/288,444

(22) Filed: Feb. 28, 2019

(65) Prior Publication Data

US 2019/0266423 A1 Aug. 29, 2019

(30) Foreign Application Priority Data

Feb. 28, 2018 (JP) .............................. JP2018-034588

(51) Int. Cl.
*G06T 5/00* (2006.01)
*G06V 20/58* (2022.01)
*B60R 11/04* (2006.01)
*G06V 20/56* (2022.01)

(52) U.S. Cl.
CPC ............ *G06V 20/582* (2022.01); *B60R 11/04* (2013.01); *G06T 5/006* (2013.01); *G06V 20/588* (2022.01); *G06T 2207/30256* (2013.01)

(58) Field of Classification Search
None
See application file for complete search history.

(56) References Cited

U.S. PATENT DOCUMENTS

| | | | |
|---|---|---|---|
| 2008/0136673 A1* | 6/2008 | Jung | G08G 1/168 340/932.2 |
| 2012/0207461 A1 | 8/2012 | Okuda | |
| 2013/0120524 A1* | 5/2013 | Zheng | G01C 21/26 348/36 |
| 2015/0332089 A1* | 11/2015 | Zhang | G06K 9/00369 382/104 |
| 2017/0140229 A1* | 5/2017 | Ogata | B60W 30/0956 |
| 2018/0182078 A1* | 6/2018 | Ozaki | G06T 5/50 |
| 2020/0090517 A1* | 3/2020 | Cetin | G06T 7/00 |

FOREIGN PATENT DOCUMENTS

| | | |
|---|---|---|
| JP | 2006-191210 A | 7/2006 |
| JP | 2012-166615 A | 9/2012 |

\* cited by examiner

*Primary Examiner* — Bernard Krasnic
(74) *Attorney, Agent, or Firm* — Maschoff Brennan

(57) ABSTRACT

An imaging system to be mounted in a vehicle is provided. The imaging system includes an optical wide-angle camera acquiring an image, and an object identifying apparatus. This object identifying apparatus executes a distortion correcting process with the acquired image and apply previously-prepared reference patterns to the image which has been subjected to the distortion correcting process such that objects in the acquired image are recognized.

11 Claims, 20 Drawing Sheets

HORIZONTAL DIREC.
(VEHICLE WIDTH DIREC.)

FIG.16
(a)
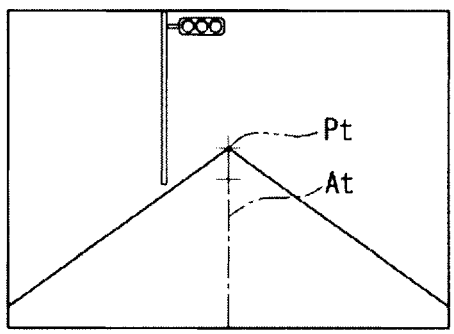
(b)
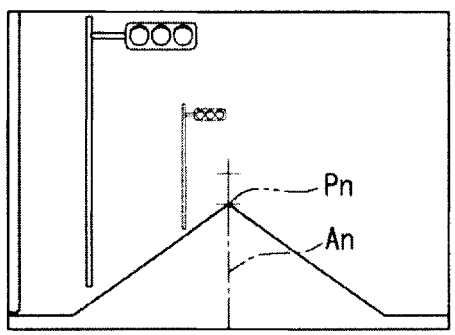
(c)
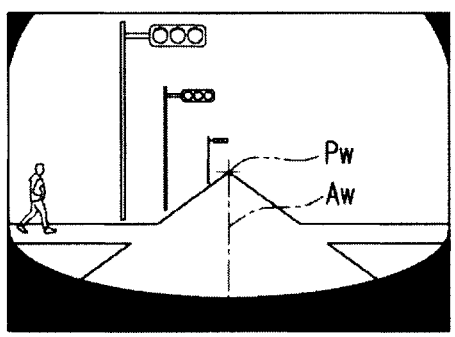
← LATERAL DIREC. →

IMAGING SYSTEM AND OBJECT IDENTIFYING APPARATUS TO BE MOUNTED IN VEHICLE, AND OBJECT IDENTIFYING METHOD TO BE EMPLOYED BY VEHICLE

CROSS-REFERENCE TO RELATED APPLICATION

This application is based on and claims the benefit of priority from earlier Japanese Patent Application No. 2018-34588 filed Feb. 28, 2018, the description of which is incorporated herein by reference.

BACKGROUND

Technical Field

The present disclosure relates to an imaging system and an object identifying apparatus, and an object identifying method which are practiced in a vehicle.

Related Art

There is known a technique for supporting drive of a vehicle by using an optical camera mounted on a vehicle. By way of example, such an optical camera has a wide-angle lens and is installed in the vehicle interior such that the camera can view a field of view in front of the vehicle through the front windshield.

SUMMARY

An exemplary embodiment is an imaging system to be mounted in a vehicle. The imaging system includes an optical wide-angle camera acquiring an image as well as an object identifying apparatus. The object identifying apparatus is configured to execute a distortion correcting process with the acquired image and apply prepared reference patterns to the image which has been subjected to the distortion correcting process such that objects in the acquired image are recognized.

BRIEF DESCRIPTION OF THE DRAWINGS

In the accompanying drawings:

FIG. 16 is an illustration exemplifying external images imaged through the lens units of the first camera;

DETAILED DESCRIPTION OF THE EMBODIMENTS

Figure 1:
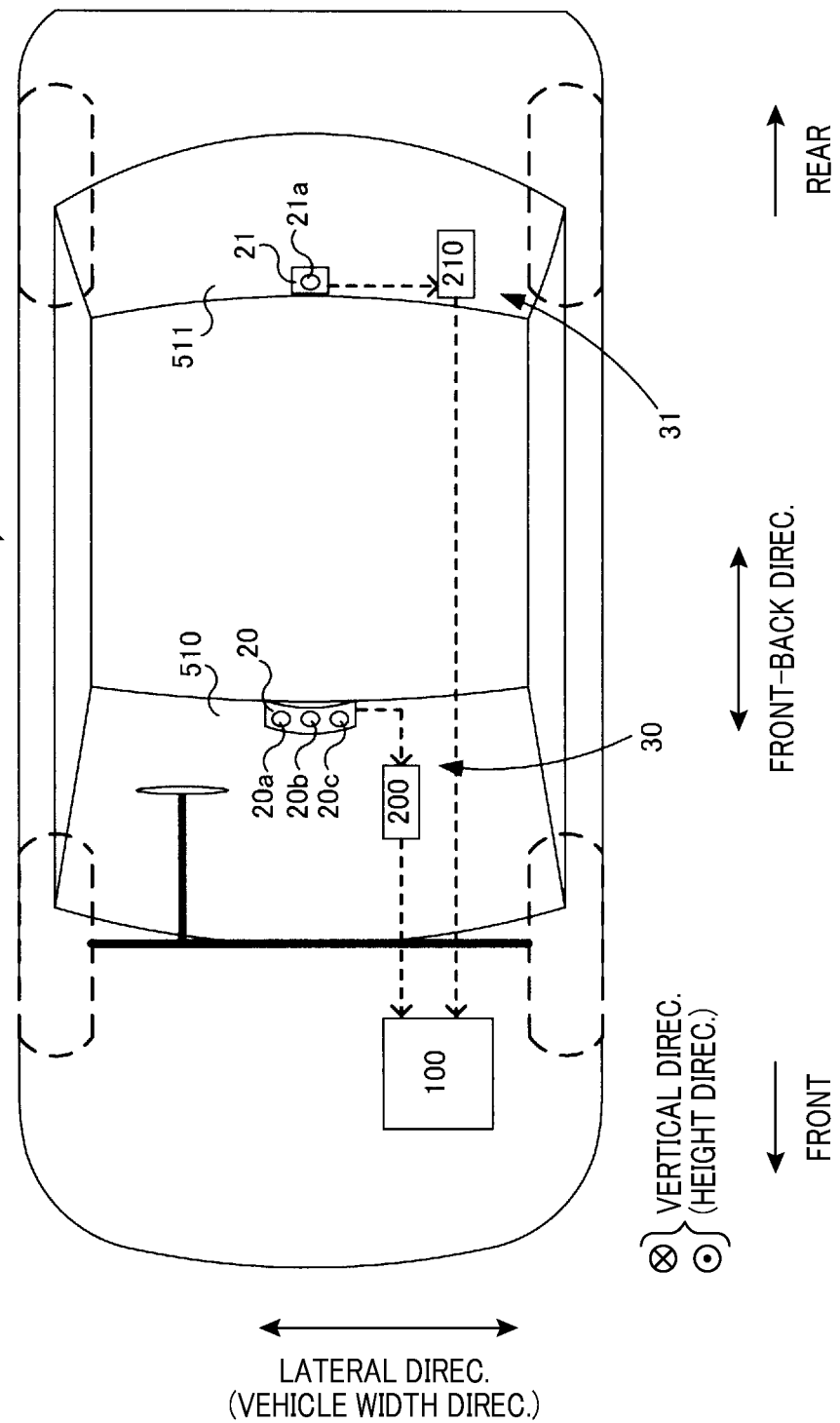
FIG. 1 is a schematic diagram exemplifying a vehicle in which an imaging system according to a first embodiment is mounted.

The following embodiments relate to an imaging system, an object identifying apparatus and an object identifying method according to the present disclosure, which are mounted on a vehicle or installed in an electronic control system of a vehicle, will now be detailed.

In one conventional technique for supporting drive of a vehicle, an optical camera is mounted on a vehicle. Such an optical camera is installed on the front the windshield of the vehicle.

When a wide-angle camera with a wide-angle lens is employed as the on-vehicle camera, the lens characteristics of the wide-angle camera shall cause distortion in peripheral areas of a captured image. This results in lowering identification accuracy for objects in such peripheral areas of captured images, if an identification pattern for identifying objects is used, in which the identification pattern is prepared on an assumption that the object is captured by a central part of the captured image because the central part is lesser in distortion or no distortion.

It is thus desired to improve recognition accuracy of objects which are or may be imaged in peripheral areas of an image acquired by the wide-angle camera.

A first exemplary embodiment is an imaging system to be mounted in a vehicle, comprising: an optical wide-angle camera acquiring an image; and an object identifying apparatus configured to execute a distortion correcting process with the acquired image and apply prepared reference patterns (RP1, RP2) to the image which has been subjected to the distortion correcting process such that objects in the acquired image are recognized.

In this imaging system, the prepared reference patterns are used to perform the distortion correcting process, so that objects which are or may be present in peripheral areas of each of images acquired from the wide-angle camera can be recognized in higher recognition accuracy.

The above configuration and advantage can be provided in other various modes of the present disclosure, which will be explained in the following embodiments, explained together with the accompanying drawings.

With reference to the accompanying drawings, an imaging system, an object identifying apparatus and an object identifying method according to the present disclosure, which are mounted on a vehicle or installed in an electronic control system of a vehicle will now be detailed.

First Embodiment

With reference to FIG. 1 to FIG. 5, object identifying apparatuses 200 and 210 according to a first embodiment are mounted on a vehicle 500.

The vehicle 500 includes a front windshield 510 toward which a frontal camera unit 20 is positioned and a rear windshield 511 toward with a rear camera unit 21 is located. Of the object identifying apparatuses 200 and 210, the one object identifying apparatus 200, which is also referred to as a frontal camera controller, is communicably linked with the frontal camera unit 20. The other object identifying apparatuses 210, which is also referred to as a rear cameral controller, is communicably linked with the rear camera unit 21. Both the frontal camera controller 200 and the frontal camera unit 20 provides in combination a front imaging system 30, while both the rear camera controller 210 and the rear camera unit provides in combination a rear imaging system 31. In other words, the object identifying apparatuses combined with the camera units compose the imaging systems 30 and 31, respectively.

The frontal camera unit 20 is provided with a wide-angle camera 20$a$, a narrow-angle camera 20$b$ and a telescopic camera 20$c$. However, it is sufficient that the frontal camera unit 20 is provided, at least, a single wide-angle camera 20$a$ or provided, at least, a single non-wide-angle camera, that is, a single camera that is one of a narrow-angle camera 20$b$ or a telescopic camera 20$c$. In addition, the wide-angle camera 20$a$, the narrow-angle camera 20$b$ and the telescopic camera 20$c$ can be arranged depending on how the cameras are used. By way of example, there can be arranged the one wide-angle camera 20$a$ and the two narrow-angle cameras 20$b$ located on both sides of the wide-angle camera 20$a$, in which the two narrow-angle cameras 20$b$ are provided as stereo cameras. Meanwhile the rear camera unit 21 can be provided with a single wide-angle camera 21$a$, but this rear camera unit 21 may be provided with, at least, a single non-wide-angle camera, in the same manner as the frontal camera unit 20.

Both the identifying apparatuses 200 and 210 are communicably connected to a main control unit 100 via control signal lines in the vehicle 500. This main control unit 100 serves as a controller for controlling how the vehicle 500 runs, so that, for this control purpose, not-shown various sensors and actuators are connected to the main control unit 100 via the control signal lines. In the first embodiment, the main control unit 100 is configured to receive identification signals provided from both the frontal and rear camera controllers 200 and 210 to control a braking system, a steering system and a power system in the vehicle 500. Hence, it is possible to have various types of driving support processes for, for example, control support, starring support, and leading vehicle tracking support.

Figure 2:
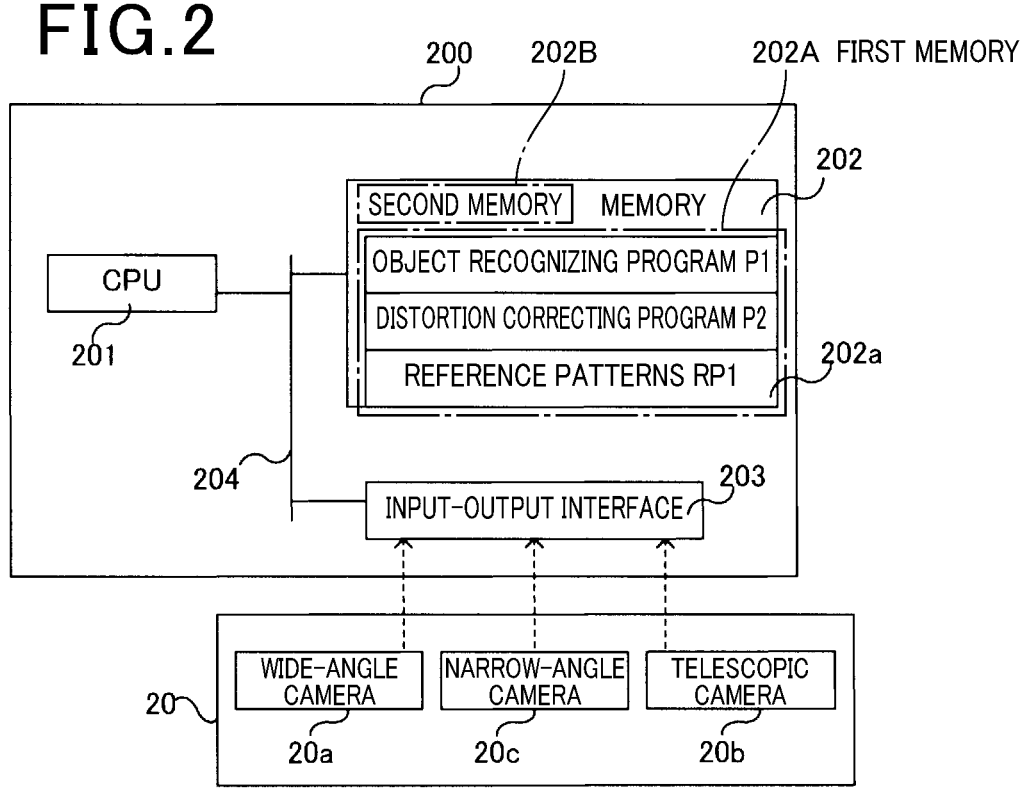
FIG. 2 is a block diagram functionally showing an object identifying apparatus in the first embodiment.

With reference to FIG. 2, the object identifying apparatus 200 will now be described. In the following, the frontal camera controller 200 will be exemplified as the object identifying apparatus.

As illustrated in FIG. 2, the object identifying apparatus 200 is provided with a central processing unit (CPU) 201 and a memory 202, which serve as a functional recognition unit, an input/output interface 203 serving as an acquisition unit, and a bus 204. Of these components, the CPU 201, memory 202 and input/output interface 203 are bilaterally communicable via the bus 204 connecting those components.

The memory 202 includes a first memory 202A, such as a ROM (read-only memory), in which various computer readable programs can be stored therein in a non-volatile manner and can be read only, and a second memory 202B, such as a RAM (random access memory), into which various data necessary for processes executed by the CPU 201 can freely be read or stored under control of the CPU 201. The programs previous stored in the first memory 202A include an object recognizing program P1 which is activated to recognize objects reflected in images acquired by cameras later described and a distortion correcting program P2 which is activated when acquired images are subjected to distortion correction. The first memory 202A can thus be provided as a non-transient computer readable recording memory for the various processes.

The first memory 202A further includes a reference pattern storing area 220$a$, in which first reference patterns RP1 previously prepared are stored in advance. The first reference pattern sRP1 are employed to recognize objects in acquired images.

In the first embodiment, the first reference patterns RP1 are provided as reference patterns for images acquired from a wide-angle camera. That is, the first reference patterns RP1 are used for identifying types of objects in wide-angle images. For this purpose, the first reference patterns RP1 focus on object distortion appearing in a central region CWC (refer to FIGS. 4 and 5) of an image acquired by a wide-angle camera.

The CPU 201 reads, from the first memory 202A, the object recognizing program P1 and the distortion correcting program P2 into a work area thereof and executes in sequence steps written in the programs P1 and P2, so that the CPU 201 functionally realizes the recognition unit. As a modification, the CPU 201 can provide the functional recognition unit by executing the object recognizing program P1 solely and the functional distortion correcting unit by executing the distortion correcting program P2 solely, thereby realizing the two functional units separately.

The CPU 201 may be composed of a single CPU or a plurality of CPUs each executing an assigned program. Alternatively, the CPU may be composed of a multiple core type of CPU which is able to execute two or more programs in parallel. Still alternatively, without being provided with the object identifying apparatus 200 as a separate apparatus, circuitry can be changed such that raw image data from the frontal or rear camera unit 20 or 21 are directly inputted as detected signals to the main control unit 200. In this circuitry, the processes for the foregoing object identification are executed by the main control unit 100.

To the input/output interface 203, the frontal camera unit 20 is electrically connected. Practically, the wide-angle camera 20a, narrow-angle camera 20b and telescopic camera 20c are electrically connected to the input/output interface 203 via control and signal lines.

Each of the cameras 20a, 20b and 20c is provided as an imaging device equipped with an imaging element such as CCDs and a single lens, and work as imaging sensors which receive incident visible light and output image data including outer contour information of objects being imaged. The image data outputted from the respective cameras 20a, 20b and 20c are composed of monochromatic pixel data or color pixel data such as RGB pixel data. In the first embodiment, each of the wide-angle cameras 20a and 21a is provided with a unifocal and wide-angle lens and an imaging element such that the respective camera 20a and 21a are given an angle of view of, for example, 120 degrees or thereabouts.

The narrow-angle camera 20b is provided with a unifocal and narrow-angle lens and an imaging element such that this camera 20b is given an angle of view of, for example, 60 degrees or thereabouts.

Additionally, the telescopic camera 20c is provided with a unifocal and telescopic lens and an imaging element such that this camera 20c is given an angle of view of, for example, 35 degrees or thereabouts. The foregoing view angles which are set to the respective cameras 20a, 20b and 29c are just examples, and other view angles can also be set as long as the angle of view to the wide-angle cameras 20a and 21a is larger than that of the narrow-angle camera 20b which is larger than that of the telescopic camera 20c. In other words, this angle relationship can be replaced by a relationship of focal lengths such that the focal lengths of the wide-angle cameras 20a and 21a are smaller than that of the narrow-angle camera 20b which is smaller than that of the telescopic camera 20c.

Still further, the narrow-angle camera and the narrow-angle lens can also be referred to as a standard camera and a standard lens, respectively, thereby being categorized as a camera and a lens which are given view angles which are set between wide and telescopic view angles.

The image data outputted respectively from the cameras 20a, 20b and 20c are subjected to a characteristic point extracting process in the object identifying apparatus 200. In this apparatus 200, shape patterns indicated by extracted characteristic points are compared with reference patterns. The referenced patterns, which are prepared in advance, show, type by type, shapes of objects being identified, which are for example shapes of four-wheel vehicles, two-wheel vehicles, and/or pedestrians. In the apparatus 200, when an extracted shape pattern is equal or analogous to one of the reference patterns, it is determined that an object has been identified, which results in producing frame data of the object.

In contrast, it is determined that there is neither agreement nor analogy (i.e., no analogy) between an extracted shape pattern and the reference patterns, i.e., the frame data are not produced. That is, in the object identifying apparatus 200, the characteristic point extracting process makes it possible to detect objects from the image data if such objects are contained in the image data, and the identification process applied to the objects extracted using the reference patterns identifies types of the extracted objects. In addition to the foregoing examples, the reference patterns include traffic lights and traffic signs such as traffic lanes and stop lines.

As described, the reference patterns are shape patterns prepared for each of the types of objects. Hence, if an object is distorted in an acquired image, identification accuracy of the object is lowered. An image acquired by the wide-angle camera 20a has a peripheral area subjected to a barrel-shaped distortion due to distortion of the lens. As a result, objects in the peripheral part of the acquired image has distorted shapes.

Meanwhile, in general, there is no distortion of the image in the light axis of the lens, thereby being less distorted around the light axis in the image. That is, objects in a central part or a non-peripheral area in the image has not distorted or has less distortion. In cases where shapes of objects imaged by the non-peripheral part, that is, shapes of objects visually recognized by the human, are defined as reference patterns, applying the first reference patterns RP1 to objects imaged by the peripheral part will lower the accuracy of pattern matching processing.

With consideration of this fact, in the first embodiment, a distortion correcting process is applied to acquired images, whereby distortion degrees in the peripheral area are reduced down to those in the non-peripheral area. This reduces the degrees of distortion of objects imaged in the peripheral area, that is, the degrees of distortion of peripherally existing objects in images, thus improving accuracy of the pattern matching process carried out with use of the first reference patterns RP1 in avoiding the distortion in the non-peripheral area When an acquired image includes a plurality of objects, a plurality of frame images each including the respective objects identified in the object identifying apparatus 200, and inputted as detected signals to the main control unit 100. Each of the frame images is composed of pixels which have positional information, i.e., coordinate information, of the identified objects. The number of frame images, which are provided as the detected signals, depend on the bandwidth of communication carried out between the object identifying apparatus 200 and the main control unit 100.

Figure 3:
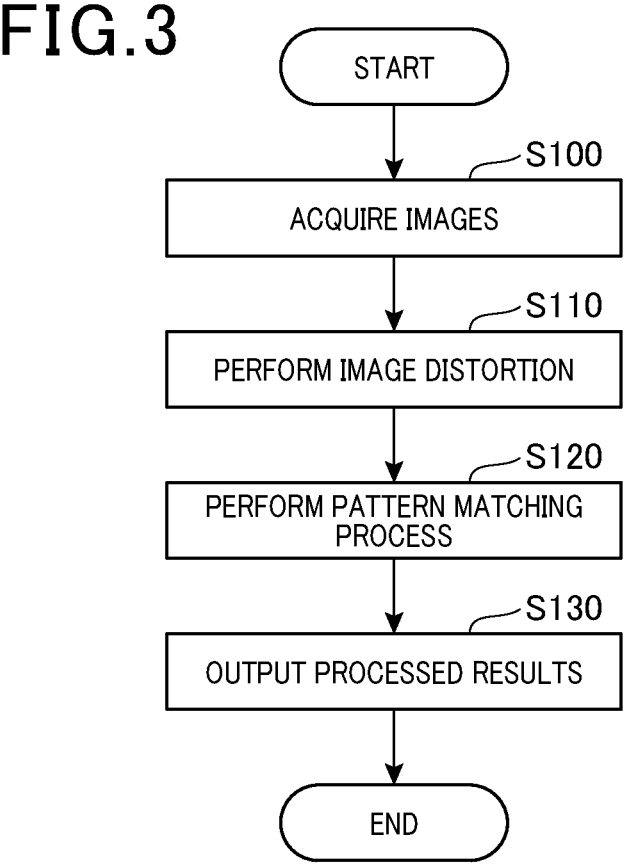
FIG. 3 is a flowchart outlining a process for recognizing existence of an object, which is executed by the object identifying apparatus in the first embodiment.
Figure 4:
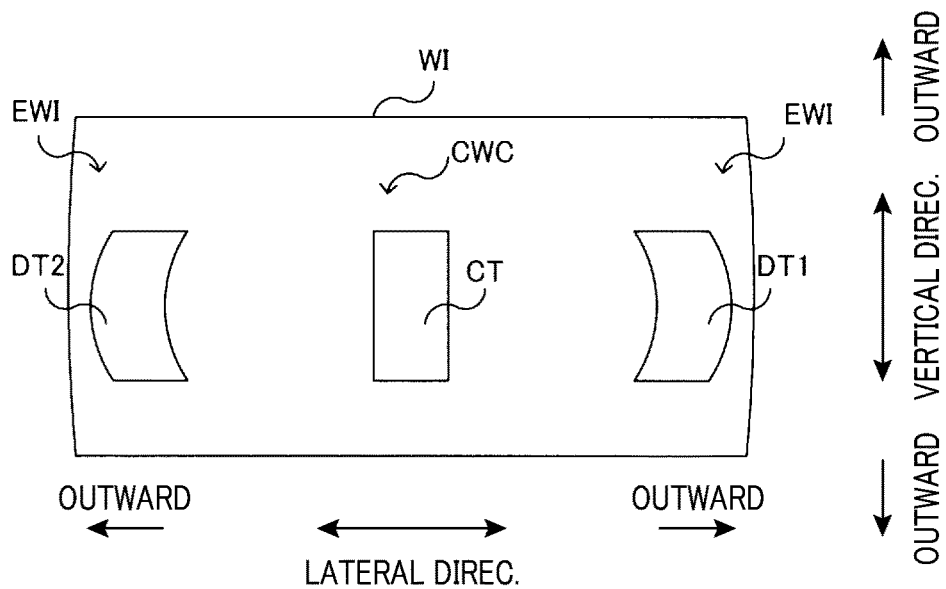
FIG. 4 is an illustration pictorially explaining an image imaged by a wide-angle camera, the image containing objects.
Figure 5:
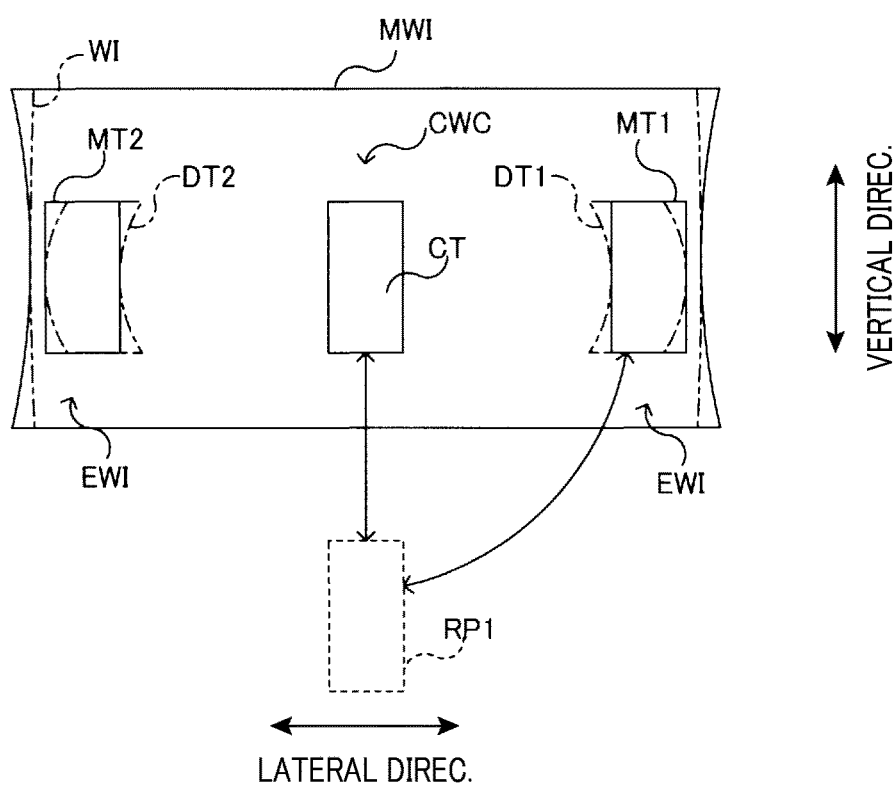
FIG. 5 is an illustration pictorially explaining an image produced by applying a distortion correcting process to the image shown in FIG. 4.

With reference to FIGS. 3 to 5, both the distortion correcting process and the object identification process according to the first embodiment, executed by the object identifying apparatus 200, will now be described. The CPU 201 executes an object recognizing program P1 and a distortion correcting program P2, thus enabling execution of the object identification process shown in FIG. 3. The processing routine shown in FIG. 3 is repeatedly executed at a predetermined interval in a duration from activation of the on-vehicle control system and shutdown thereof or from turning on an ignition switch to turning off thereof. Additionally, in the first embodiment, the object identification process is applied to images acquired by the respective cameras 20a, 20b, and 20c, while the distortion correcting process is applied to images acquired by only the wide-angle camera 20a. In the following, as a representative therefor, the processes assigned to images acquired by the wide-angle camera 20a will be exemplified.

The CPU 201 acquires an image picked up the wide-angle camera 20a via the input/output interface 203 serving as the acquisition unit (step S100). Then the CPU 201 executes the distortion correcting program P2, thus resulting in the execution of the distortion correcting process to the acquired image (S110). For example, as illustrated in FIG. 4, the wide-angle image WI from the wide-angle camera 20a has barrel-shaped distortion areas expanded in a barrel shape in the horizontal or lateral direction, i.e., the width direction of the vehicle provided with the frontal camera unit 20.

Practically, the wide-angle image WI has a central area CWC, which is a non-peripheral area in the wide-angle image WI. In this case, if there is contained an object CT in the central area CWC, the object CT will not be distorted or, if being distorted, has only a small amount of distortion. Meanwhile, the wide-angle image WI has peripheral areas EWI located at peripheral partial portions in the wide-angle image WI, which are located in both end parts in the horizontal direction. In this case, if there are objects DT1 and DT2 in such peripheral areas EWI, it cannot avoid the objects DT1 and DT2 from being distorted, which makes the object shapes expand outward in a barrel shape in the horizontal direction.

When the distortion correcting process is carried out, the object shapes are corrected as exemplified in FIG. 5, for instance. Specifically, the wide-angle image WI shown by dashed-dotted lines are corrected to a post-corrected wide-angle image MWI, according to which the distorted objects DT1 and DT2 are also corrected in their shapes to post-corrected objects MT1 and MT2. In the present embodiment, as a result, the distortion correcting process for the wide-views image WI captured by the wide-angle camera 20a reduces the degree of distortion occurring in the peripheral areas EWI of the wide-angle image WI, down to a distortion degree of the wide-angle image, i.e., to a distortion degree owned by the central area CWC in the wide-angle image. Hence, it is possible to reduce the distortion degrees of the objects DT1 and DT2 down to, at least, a distortion degree shown by objects residing in the central area CWC.

In FIG. 5, for an easier explanation and understanding, the objects DT1 and DT2 are given distorted shapes which are exaggerated, thereby exaggerating the corrected amounts. In the same purpose as the above, FIGS. 4 and 5 show an example in which the distortion of both the wide-angle image WI and the after-corrected wide-angle image MWI in the horizontal direction are exaggerated. By the way, as a matter of course, the distortion will occur in the vertical or longitudinal direction. Due to this distortion, objects imaged in the vertical peripheral areas undergo distortion which spreads from the central area CWC outward in the vertical direction.

In addition, the distortion correcting process for the wide-angle image WI is applied to the entire area of the wide-angle image, but, depending on a correction level for the distortion, the entire image area will not always be subjected to the distortion correcting process. For example, the distortion correcting level is set to a level which allows the process to be applied to only the central area CWC of the wide-angle image WI, the distortion correction cannot be applied to, at least, a part of the central area CWC. Alternatively, if the distortion correcting level is set to another level for correcting distortion of the narrow-angle image, the central area CWC will treated by the distortion correction.

The distortion correcting process will now be detailed.

This process is carried out by the CPU 201 which reads designed values or actually measured individual characteristic values of the lens, which are previously stored in the memory 202, and such values are used in performing the distortion correcting process applied to the image.

The designed values are distortion values (optical aberration values) of the single wide-angle lens provided in the wide-angle camera 20a, and specifically, TV distortion values. The distortion value is expressed by a percentage. When using the designed values, an light axis of the wide-angle camera 20a in the acquired image, that is, an optical coordinate system, is first obtained, and the distortion values are then used in accordance with the light axis center to expand or compress the image in the vertical and lateral directions such that the distortion correcting process is carried out.

Practically, the coordinate positions of the respective pixels composing an image are first coordinate-converted using, for example, an affine conversion so as to move the positions in the vertical and lateral directions. Since the images from the wide-angle camera 20a have peripheral areas which present stronger distortion, it is enough that only the pixels in previously defined peripheral areas are coordinate-converted for the image expansion and compression. Alliteratively, a grid template for distortion correction previously prepared can be overlapped on the acquired image so that both optical axes agree with each other, and pixel values at the respective grid points are correction-calculated using values of pixels around each grid point.

The individual characteristic values are defined as optical distortion values, which are provided as actually measured distortion characteristics of the wide-angle camera 20a. Those characteristics can be obtained by making the wide-angle camera 20 image a grid chart. When using the individual characteristic values, not only the lens characteristics but also installation tolerance can be corrected, which is led to improvement in the object identification accuracy.

Further, the optical distortion values can be expressed as percentage values obtained by divide a difference, by a grid distance, in which the difference is obtained between each grid distance and each imaging distance. The grid distance is a distance from the light axis position to each grid position on the grid chart, while the imaging distance is a distance from the light axis position to an imaging gird position corresponding to a grid position in the acuariid image.

Specifically, the optical distortion values are set previously to the respective imaged grid positions. When using the individual characteristic values, the light axis of the wide-angle camera 20a in the acquired image is obtained in advance, the optical distortion values are applied to the pixels at the acquired image grid positions for coordinate conversion, and correction is performed at pixels each of which is present between the nonboring grid positions, thus providing the distortion correcting process. Examples of this correction process are a nearest neighbor method, a bilinear method, and a bicubic method, which are categorized as interpolation techniques.

The CPU 201 develops after-corrected images which have been subjected to the distortion correcting process, into the memory 202, more particularly, into the frame memory, so that the CPU 201 performs an identification process with use of the first reference pattern RP1 (step S120). This is a pattern matching process. Specifically, as illustrated in FIG. 5, the CPU 201 uses the first reference patterns RP1 for the wide-angle images so as to perform the pattern matching process with the objects CT, MT1 and MT2 which are or may be present in the after-corrected wide-angle image MWI. As described, the first reference patterns RP1 are prepared in advance with aiming at objects CT which are or may be present in the central area of the wide-angle image.

The CPU 201 then outputs, to the main control unit 100, identified results including attribute information indicating frame images and identified objects (step S130), and ends the processing routine.

The foregoing process is also performed by the rear object identifying apparatus 210 communicably connected to the rear camera unit 21. Moreover, except for the distortion correcting process, the identification process is performed, according to the foregoing procedures, for objects reflected in imaged acquired by the narrow-angle camera 20b and the telescopic camera 20c, which are other than the wide-angle cameras.

In the object identifying apparatus 200 according to the first embodiment, the images acquired by only the wide-angle camera 20a are first subjected to the distortion correcting process, and then treated by the object identification process on the entire image with use of the first reference patterns RP1 prepared for the wide-angle images. As a result, even when adopting the first reference patterns RP1 for the wide-angle images, it is possible to raise identification accuracy of objects DT1, DT2 which are or may be present in the peripheral areas of the wide-angle images WI. Additionally, in this object identification, without adopting a plurality of sets of reference patterns which are assigned set by set to a plurality of areas of the acquired image, only one kind of reference patterns, i.e., the first reference patterns, can be used to identify objects over the entire area of each of the acquired images.

Second Embodiment

With reference to FIG. 1 and FIGS. 6 to 8, a second embodiment will now be described.

An object identifying apparatus and an imaging system, which are according to the second embodiment, are provided with, in addition to the front camera, a rear object identifying apparatus 210, a rear wide-angle camera 21a, and a rear imaging system 31 (refer to FIG. 1). The other configurations are identical or similar to those of the object identifying apparatus 200 and the imaging system explained in the first embodiment. Hence, for simplification of the explanations, the same or similar components as or to those explained are given the same reference numerals, with omitting the redundant explanations.

In the object recognition apparatuses 200 and 210 of the second embodiment, a plurality of sets of reference patterns prepared for a plurality of imaging areas in each of images acquired from wide-angle cameras 20a and 21a are used to recognize objects which are or may be present in the images.

Figure 6:
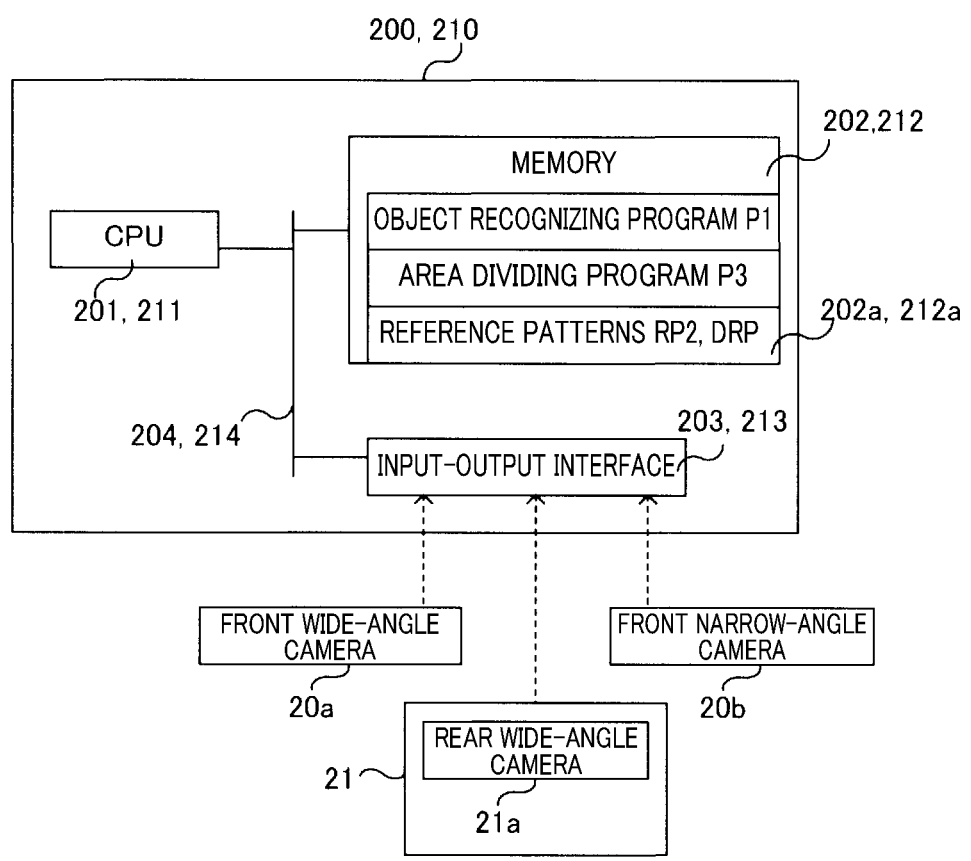
FIG. 6 is a block diagram functionally showing an object identifying apparatus according to a second embodiment.

The rear object identifying apparatus 210, which serves as an object identifying apparatus according to the second embodiment, has a configuration illustrated in FIG. 6. That is, the apparatus 210 is provided with a CPU (central processing unit) 211 and a memory 212, which configure a recognition unit, an input/output interface 213 serving as an acquisition unit, and a bus line 214 bilaterally communicably connecting the CPU 211, memory 212 and input/output interface 213. To the input/output interface 213, a rear camera unit 21 is communicably connected via control signal lines. The front object identifying apparatus 200, which is also an object identifying apparatus, has already been explained in the first embodiment, thus omitting the explanation thereof.

In the second embodiment, the front and rear object identifying apparatus 200 and 210 have the memories 202 and 211, respectively, in each of which there are provided with an object recognizing program P1, an area dividing program P3, and reference pattern storing areas 220a, 221a. Of these, the object recognizing program P1 is stored for recognizing objects which are or may be present in acquired images. The area dividing program P3 is prepared for dividing an acquired image into desired areas. In the reference pattern storing areas 220a and 221a, there are stored a plurality of sets of second reference patterns prepared in advance and a peripheral-area reference pattern DRP.

The reference patterns used in the second embodiment includes the second reference patterns RP2 and the peripheral-area reference pattern DRP. The second reference patterns RP2 are directed to improve distortion caused in a central area of a narrow-angle image, that is, a non-wide-angle image and are for identifying objects which are or may be present in the central area in the narrow-angle image. The peripheral-area reference patterns DRP are for identifying objects which are or may be present in end areas of the wide-angle image. The peripheral-area reference patterns DRP are prepared as object shape patterns directed to distortion caused in peripheral areas, i.e., end areas, of an image acquired from the wide-angle camera 20a.

Figure 7:
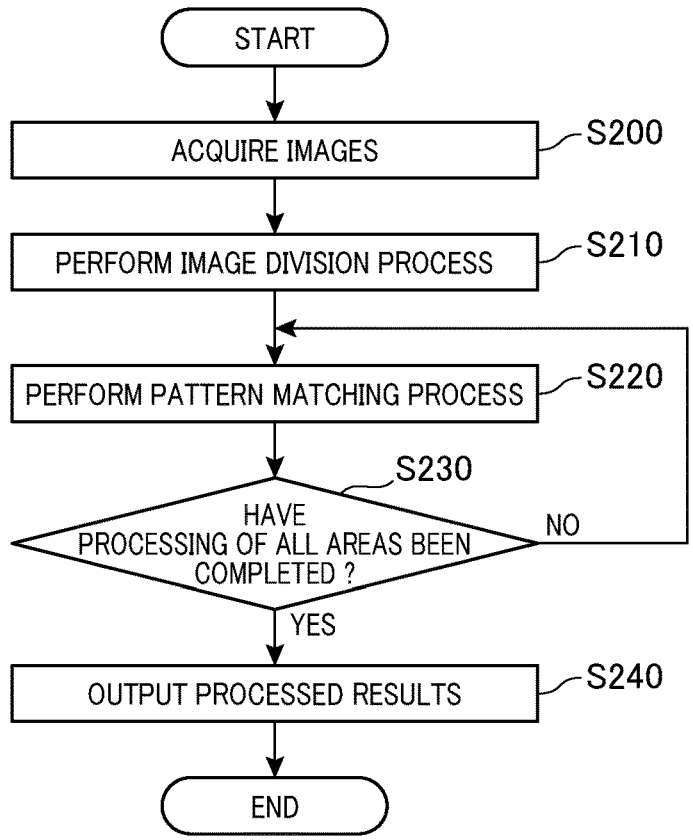
FIG. 7 is a flowchart outlining a process for recognizing existence of an object, which has been executed by the object identifying apparatus in the second embodiment.
Figure 8:
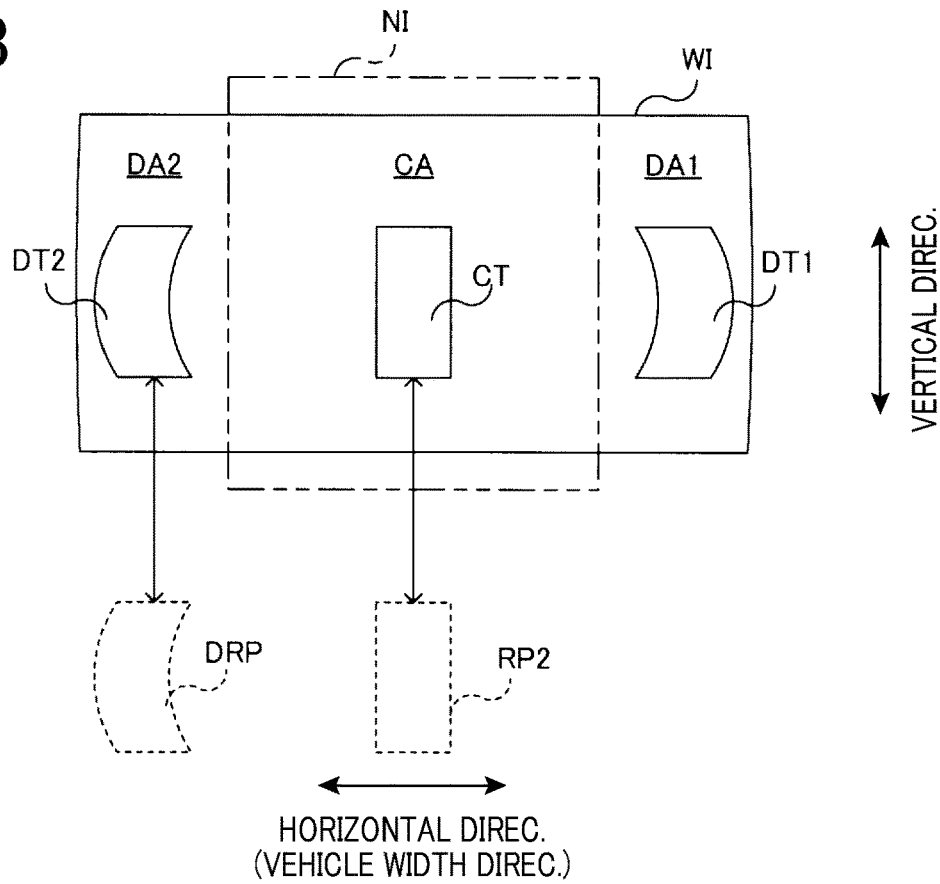
FIG. 8 is an illustration pictorially explaining an image with objects, which has been imaged by a wide-angle camera and subjected to an area dividing process.

With reference to FIGS. 7 and 8, a distortion correcting process and an object identification process will now be described, which are executed by the object identifying apparatus according to the second embodiment. The CPU 201 is configured to execute both the object recognizing program P1 and the area dividing program P3, thereby enabling performance of the object identification process shown in FIG. 7.

The processing routine shown in FIG. 7 is repeated at predetermined intervals in a duration, for example, from activation of the in-vehicle control system to stop thereof or turning on the ignition switch to turning off thereof.

In the second embodiment, the object identification process is applied to each of images acquired by the respective cameras 20a, 20b, and 21a. For the sake of a simplified explanation, the front object identifying apparatus 200 will now be exemplified as a representative. Meanwhile, the area dividing process is applied to only images acquired by the front wide-angle camera 20a and the rear wide-angle camera 21a. Similarly to the foregoing, the process for the images acquired by the front wide-angle camera 20a will now be explained as a representative.

The CPU 201 acquires images imaged by the wide-angle camera 20a, via the input/output interface 203 serving as an acquisition unit (step S200). After this image acquisition, the CPU 201 performs the area dividing program P3 such that an area dividing process is applied to an acquired image to divide the entire image area into a plurality of divided areas (step S201).

For instance, as illustrated in FIG. 8, the wide-angle camera 20a captures a wide-angle image WI having a horizontal direction, that is, a width direction of the vehicle provided with the frontal camera unit 20. This wide-angle image WI undergoes a barrel-shaped distortion which extends the image in a barrel shape in the horizontal direction. Moreover, this wide-angle image WI provides a non-peripheral area in which an object CT, if existing, undergo only a lower degree of distortion, called a wide-angle distortion, or undergo no distortion. However, in both end areas of the wide-angle image WI in the horizontal direction, objects DT1 and DT2 which are or may be present in the end areas are influenced by distortion which largely distorts their shapes toward an outside direction departing from the central area CA in a barrel shape (refer to FIG. 8).

The CPU 201 divides the wide-angle image WI into three areas consisting of a central area CA and both end areas DA1 and DA2 corresponding to peripheral areas. The central area CA overlaps the angle of view of a narrow-angle image NI captured by the narrow-angle camera 20b, while the end areas DA1 and DA2 including a right end area DA1 and a left end area DA2 do not overlap the angle of view of the narrow-angle image NI.

Dividing an image area can be realized by, for example, assigning the horizontal and vertical directions of the wide-angle image WI to an x-axis and a y-axis and regulating the central area CA and end areas DA1, DA2 by x- and y-axis coordinate positions. Because the positions of the pixels composing the wide-angle image WI can be defined by pixel coordinate positions, pixels providing the central area CA and both the end areas DA1, DA2 can be specified easily.

The CPU 201 then develop, into the memory 202, more practically, a frame memory thereof, image data of one of the divided three areas CA, DA1, and DA2 of the acquired image, and apply the identification process based on the second reference patterns RP2 and peripheral-area reference patterns DPR, both of which are for the developed area. In other words, a pattern matching process is executed (step S220).

The CPU 201 then proceeds to the next step to determine whether or not the pattern matching process has ended for all the three areas of the image (step S230). If it is determined that the pattern matching process has not ended yet for all the three areas (NO at step S230), the CPU 201 returns its processing to step S220 to apply the pattern matching process a remaining area CA (DA, DA2) for completion of the pattern matching.

Practically, as illustrated in FIG. 8, the CPU 201 applies, to an object CT in the central area CA, the previously-set second reference patterns RP2 directed to distortion of the narrow-angle image, resulting in the pattern matching process performed based on the second reference patterns RP2. In contrast, the CPU 201 applies, to objects DT1 and DT2 in the end areas DA1 and DA2, the previously-set peripheral area reference patterns DPR directed to distortion of wide-angle images, resulting in the pattern matching performed based on the peripheral area reference patterns DPR. In the wide-angle image WI, the distortion caused in the central area CA is similar to or not changed much from the distortion caused in the narrow-angle image. For this reason, even if the second reference patterns RP2 directed to improvement of distortion caused in the narrow-angle image are adopted, it is possible to identify objects without being affected largely in identification accuracy.

Therefore, without being provided with the reference patterns directed to distortion caused in the wide-angle image, the object identification process for the wide-angle image WI can be achieved as a convenient approach. Of cause, for requiring a higher degree of the object identification, the reference patterns inherent to the wide-angle image can be applied to the central area. Incidentally, the peripheral-area reference patterns DRP and DRP for the right and left end areas DA1 and DA2 are linearly symmetric to each other with the center line along the vertical direction of the wide-angle image WI.

The wide-angle camera 20a outputs images repeatedly at intervals. Hence, the area of an image being acquired can be divided in advance into the central area CA and both end areas DA1 and DA2 to obtain coordinate positional information thereof. Such information indicating the coordinate positions can previously be stored in the memory 202. Alternatively, the coordinate positional information indicating the positions of the central area CA and both end areas DA1 and DA2, which are obtained when the first area dividing process has been performed, can be stored in the memory 202. The stored coordinate positional information can be used in current execution of the identification process.

When completing the pattern matching process for all of the areas (YES at step S230), the CPU 201 outputs, to the main control unit 100, identified results including the acquired and processed frame image data and information indicating objects in the images (step S240), and then ending the processing routine.

The foregoing process is also conducted in the same manner as the above in the rear object identifying apparatus 210 having communication with the rear camera device 21. As for objects imaged in the images acquired by the narrow-angle camera 20b and the telescopic camera 20c which are other than the wide-angle camera 20a, the identification process according to the forgoing procedure, but except for the area dividing process, can be conducted.

As described, by the object identifying apparatus 200 according to the second embodiment, the area dividing process is performed so as to divide the entire area of an image acquired by the wide-angle camera 20a, into a plurality of areas. A plurality of sets of reference patterns prepared for the respective divided areas, that is, in the second embodiment, the second reference patterns RP2 and the peripheral-area reference patterns DRP are used to perform the object identification process for each of the divided areas.

It is therefore possible to perform the pattern matching process depending on how each divided-area image is distorted, in other words, by using the second reference patterns RP2 and the peripheral-area reference patterns DRP which dedicatedly targets on distortion of objects in the respective divided areas. This makes it possible to improve identification accuracy of the objects DT1 and DT2 in the peripheral areas DA1 and DA2 of the wide-angle image WI.

It is also possible that, without conducting the distortion correcting process for acquired images in identifying the objects, the identification accuracy of the objects DT1 and DT2 in the peripheral areas DA1 and DA2 of the wide-angle image WI is raised.

Further, the second reference patterns RP2 directed to distortion in the narrow-angle image is applied to the enteral area CA of the wide-angle image WI. Hence, it is not required to purposely prepare a further reference pattern dedicated to the central area CA of the wide-angle image WI.

Third Embodiment

A third embodiment will now be described.

In the first embodiment, the object identifying apparatus 200 is configured to perform the distortion correcting process with the entire area of a wide-angle image acquired by the wide-angle camera 20a, whereby the distortion in the peripheral areas EWI is reduced. In contrast, this distortion correcting process can be applied to the image entire area to lower the distortion in the wide-angle image down to a distortion level of the narrow-angle image, i.e., a level of distortion caused in the non-wide-angle images.

In such a configuration, a distortion correcting level can be raised so that the object identification accuracy is improved. Additionally, the object identifying apparatus 200 cannot be required to be provided with the first reference patterns RP1 for the wide-angle images. Hence, it is possible to use only the second reference patterns RP2 directed to distortion (i.e., referred to as non-wide-angle distortion) caused in the narrow-angle images. By this usage of only the second reference patterns RP2, the pattern matching process can be conducted with the images acquired by both the wide-angle and narrow-angle cameras 20a and 20b.

Furthermore, the object identifying apparatus 200 can be configured to perform the distortion correcting process to correct the distortion caused in the wide-angle image down to a level which is almost equal to the maximum distortion of the narrow-angle images by targeting the entire area of each of the wide-angle images acquired by the wide-angle camera 20a.

In this configuration, it is also possible to raise the distortion correcting level so that the object identification accuracy can be improved. Moreover, in this configuration, time and calculation load required for performance of the distortion correcting process can be reduced. In addition, only the second reference patterns RP2 directed to the foregoing non-wide-angle distortion may be used to perform the pattern matching process to the images captured by both the wide-angle and narrow-angle cameras 20a and 20b.

Fourth Embodiment

A fourth embodiment will now be described, which relates to the wide-angle camera.

The wide-angle camera 20a employed in the first embodiment has been described as having the typical wide-angle lens, but not limited to this usage. This wide-angle lens can be provided as a central fossa lens.

Figure 9:
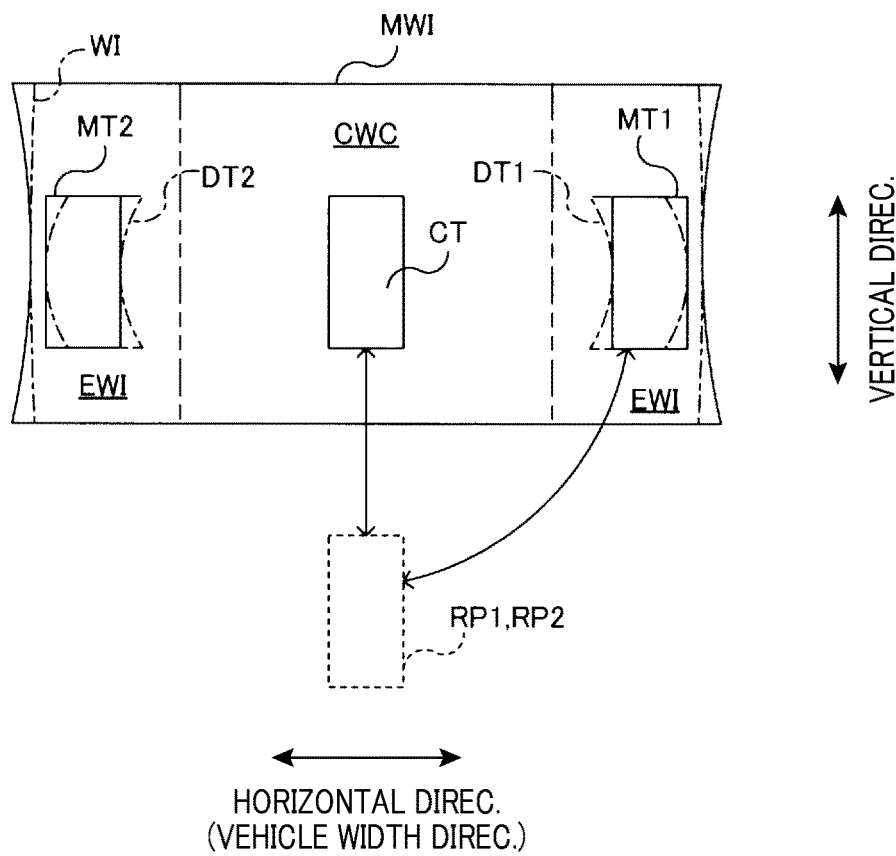
FIG. 9 is an illustration pictorially explaining an image with objects, which is imaged by a central fossa camera, in which a circumference of the image has been subjected to the distortion correcting process.

As illustrated in FIG. 9, the central fossa lens belongs to orthogonal projection type fisheye lenses, which have an optical characteristic which magnifies images in the central area CWC (which can be defined as a designated area whose center line is a light axis) and compresses images in the peripheral areas EWI (which can be defined as areas other than the central area CWC).

The central fossa lens has a characteristic formula expressed by y=f·sin (θ), wherein y denotes an image height and θ denotes a half angle of view.

In contrast, the wide-angle lens used in the first embodiment is a lens of central orthogonal projection type whose characteristic formula is expressed by y=f·tan (θ). Hence, the central fossa lens according to the present embodiment has a wide angle of view, an image distortion value less than a predetermined value in the central area CWC, and an image distortion value larger than the predetermined value in the prepuberal areas EWI.

In the present embodiment, by way of example, the foregoing predetermined value may be set as a distortion value in the central area of a narrow-angel image acquired by the narrow-angle camera. Alternatively, the foregoing predetermined value may be set as the maximum distortion value of the narrow-angle image. Accordingly, by using such a central fossa lens, the central area CWC can provide images having lesser distortion and higher resolution, thereby reducing the sizes of image areas which must be treated with the distortion correcting process.

In other words, as illustrated in FIG. 9, it is possible not to perform the distortion correcting process with the central area CWC of the wide-angle image WI, and, in contrast, to apply this process to only the peripheral areas EWI so as to correct the distortion of the wide-angle image WI.

In the identification process for the objects CT, MT1 and MT2, it is possible to identify the object CT, with higher precision, based on the second reference patterns RP2 directed to the narrow-angle image, because the distortion in the central area CWC is almost equal to that in the narrow-angle image. To the peripheral areas EWI, the distortion correcting process is applied until a distortion level of either the wide-angle image can be gained or the narrow-angle image. As a result of this process, it is still possible that the objects MT1 and MT2 are identified at higher accuracy even using the first reference patterns RP1 directed to the wide-angle image WI. Hence, it is still advantageous in a lowered calculation time necessary for the distortion correcting process and reduced calculation load.

As a modification, a curved imager can be applied to acquired images to remove distortion in the horizontal or vertical direction of the images, wherein the distortion correcting process is performed with the images processed by the curved imager. This modification also makes it possible to reduce a calculation time necessary for the distortion correcting process and amounts of calculation load.

Fifth Embodiment

A fifth embodiment is concerned with image areas to which the distortion correcting process is applied.

In the first embodiment, the entire area of a wide-angle image WI acquired by the wide-angle camera 20a is subjected to the distortion correcting process to reduce or remove the wide-angle distortion. However, this is just an example. Only the peripheral areas EWI of such wide-angle image WI may be subjected to the distortion correcting process.

For example, the image area is first vided into areas, as explained in the second embodiment, and only the images of peripheral areas EWI is treated by the distortion correcting process to reduce a distortion level thereof down to equally or almost equally to the distortion level owned by a central areas CWC of the wide-angle image WI. In this configuration, the image areas to be targeted by the direction correcting process are limited to the peripheral areas EWI, result in shortening a time duration for the distortion correcting process and calculation load.

In the identification process for the objects CT, MT1 and MT2, the pattern matching process is performed such that the first reference patterns RP1 adapted to the central area CWC of the wide-angle image WI are applied to the peripheral areas EWI, while the second reference patterns RP adapted to the narrow-angle image are applied to the central area CWC.

Specifically, the distortion in the central area CWC has a degree which enables objects to be identified properly by a pattern matching process based on the second reference patterns RP2, so that use of the second reference patterns RP2 makes it possible to identify the objects reliably. The one kind of first reference patterns RP1 adapted to the central area CWC of the wide-angle image WI can be applied to the whole area of the image for the pattern matching process. Alternatively, the one kind of second reference patterns RP2 directed to distortion caused in the narrow-angle image can be applied to the whole area of the image for accomplishing the pattern matching process.

Sixth Embodiment

A sixth embodiment will now be described, which relates to an image area to which the distortion correcting process is applied.

Figure 10:
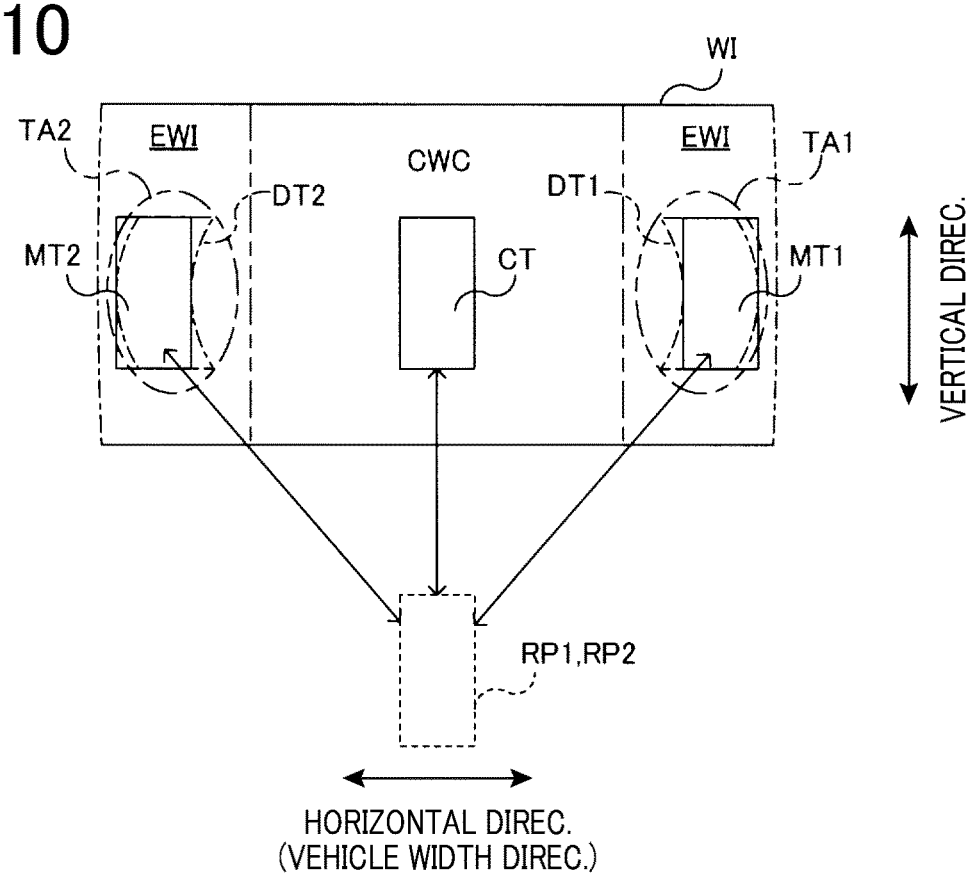
FIG. 10 is an illustration pictorially explaining an image with objects, which is imaged by a wide-angle camera, in which portions surrounding objects existing along the circumference of image has been subjected to the distortion correcting process.

In the fifth embodiment, the distortion correcting process is applied to the entire peripheral areas EWI of the wide-angle image WI picked up by the wide-angle camera 20a, which corrects the distortion of the wide-angle image WI. However, this can be modified such that, as illustrated in FIG. 10, the distortion correcting process is applied to only surrounding areas TA1 and TA2 each surrounding an object DT1 (DT2) in each of the peripheral areas EWI.

As described, when image data are inputted from the wide-angle camera 20a to the object identifying apparatus 200, the apparatus 200 detects where or not there are object candidates in the acquired image and calculates the positions of the object candidates, if such object candidates are detected. Thus, the apparatus 200 is able to extract object candidates which are present in the peripheral areas EWI of the acquired image, that is, extract images of surrounding areas TA1 and TA2 containing possible objects which may corresponds to objects DT1 and DT2.

The object identifying apparatus 200 then stores image data of the extracted surrounding areas TA1 and TA2 into the frame memory, and apply the foregoing distortion correcting process to the developed image data to obtain the objects MT1 and MT2 which have been distortion-corrected. Hence, the image area which must be distortion-corrected is limited to the surrounding areas TA1 and TA2 in the peripheral area EWI, resulting in a shortened time for distortion correcting process and a lesser calculation load thereof.

The present embodiment can further be modified such that the distortion corroding process is not applied to the central area CWC or the distortion correcting process is applied to the central area CWC so as to reduce the distortion down to a level of distortion appearing in the narrow-angle image.

In the identification process to identify the types of the objects CT, MT1, MT2, the first reference patterns RP1 adapted to the central area CWC of the wide-angle image WI can be applied to the peripheral area EWI, and the second reference patterns RP adapted to the narrow-angle image can be applied to the central area CWC, so that the pattern matching can be performed. As a modification, the one kind of first reference patterns RP1 adapted to the central area CWC of the wide-angle image WI may be applied to the entire image area for the pattern matching. When being compared with the distortion caused in the peripheral areas EWI, the distortion caused in the central area CWC has a degree which still makes it possible to reliably identify objects through the pattern matching process performed based on the second reference patterns RP2. Hence the second reference patterns RP2 can still be used for the object identification in a reliable manner.

Seventh Embodiment

A seventh embodiment will now be described, which relates to how to make the control unit.

In the forgoing embodiments, the CPU 201 and 211 execute the object recognizing program P1, the distortion correcting program P2 and the area dividing program P3 in order to provide a software-based control unit. However, the control unit can be provided by using previously programmed integrated circuits or discrete hardware circuits.

<Practical Camera Configuration>

The frontal camera unit 20 and the rear camera unit 21 employed in the foregoing embodiments will now be detailed in their configurations.

<First Exemplary Configuration>

Figure 11:
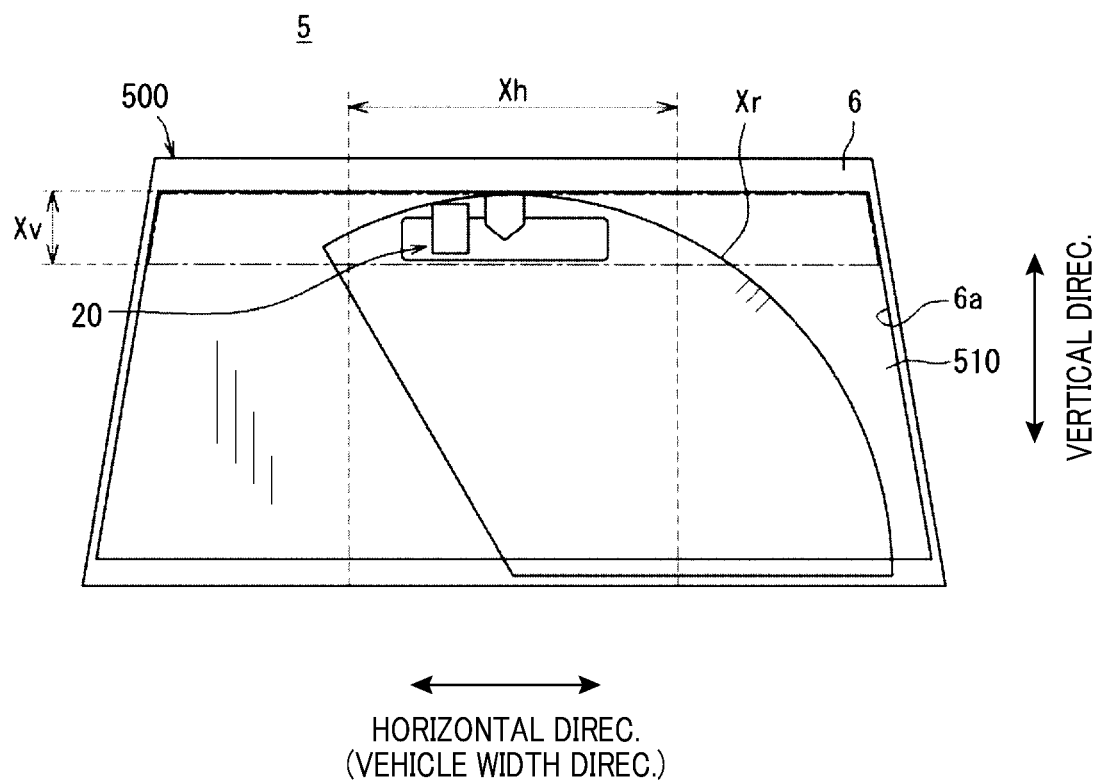
FIG. 11 is a view explaining the front of a vehicle, on which a frontal camera unit is mounted.
Figure 12:
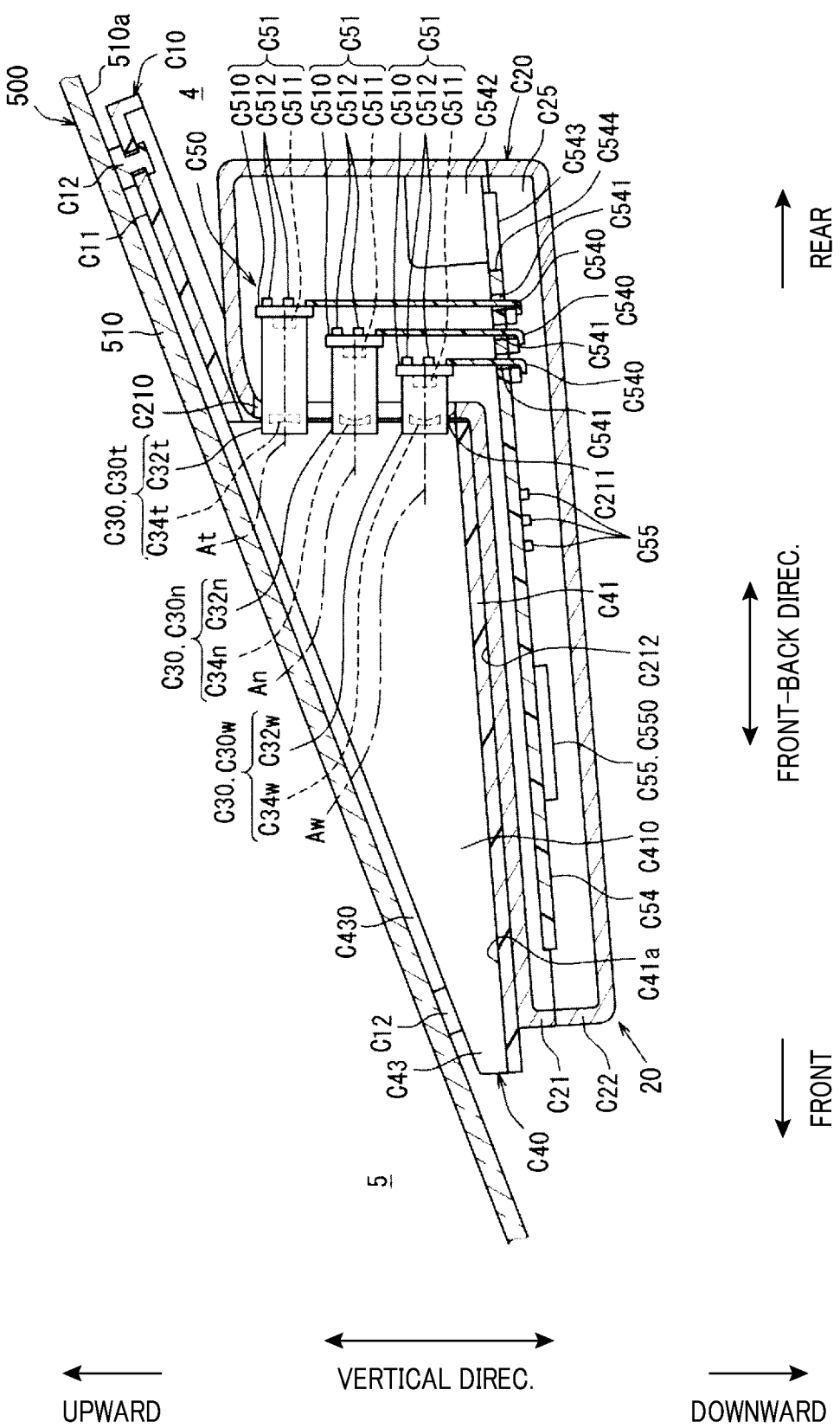
FIG. 12 is a sectional view exemplifying the internal configuration of a first camera.

As illustrated in FIGS. 11 and 12, the frontal camera unit 20 is attached to the inside surface of the front windshield 510 of the vehicle 500 so as to image an external field 5 of the vehicle 500. Inside the vehicle interior, the front camera unit 20 is installed not to interrupt a view of field of the occupants including a driver sat on the driver's seat. Practically, as shown in FIG. 11, there is provided a pillar 6 holding the periphery edge frame of the front windshield 510. The pillar 6 has a window 6a. The frontal camera unit 20 is positioned within a range Xh in the horizontal direction, i.e., the vehicle width direction. The range Xh is decided to be, for example, a range of approximately 15 cm, with the center of the window 6a located at the center of the range Xh in the horizontal direction. In the vertical direction of the vehicle 500, the front camera unit 20 is arranged to be located within a range Xv of, for example, 20% of the vertical length of the window 6a when being measured from the upper edge of the window 6a. As a result, the frontal camera unit 20 is located within a wiping range Xr of the wiper which wipes the front windshield 510 when viewed in the front-back direction. Additionally, the frontal camera unit 20 is located along, of the front windshield 510, its part of 22 to 90 degrees to the front-back direction, for instance.

Figure 13:
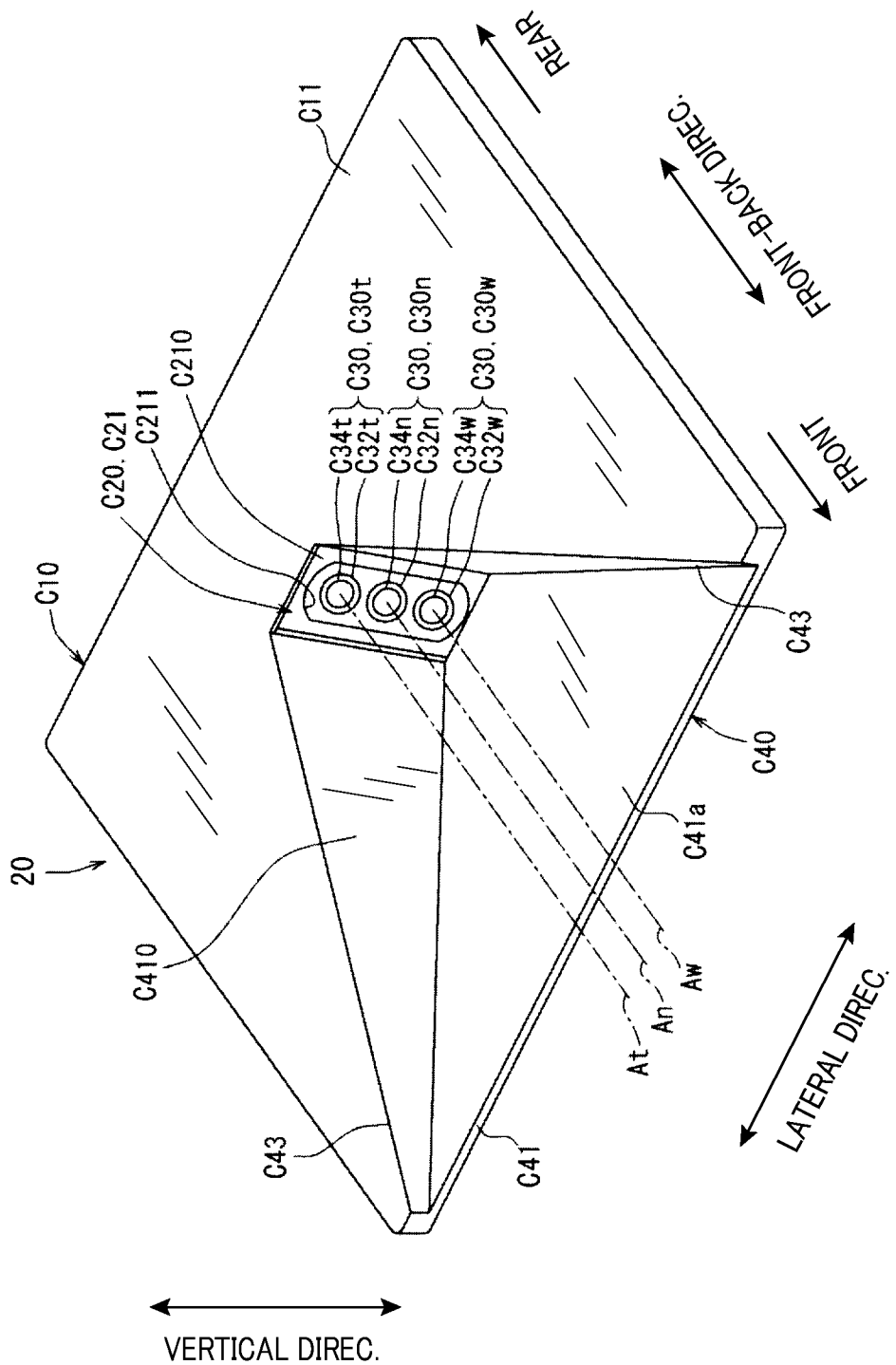
FIG. 13 is a sectional view exemplifying the external configuration of the first camera.

As shown in FIGS. 12 and 13, the frontal camera unit 20 is provided with a bracket assembly C10, a camera casing C20, a plurality of lens units C30, a hood 40, and an imaging system C50. In FIG. 13, partial components are omitted from being drawn.

The bracket assembly C10 includes a bracket body C11 and a loading pad C12. The bracket body C11 is made of hard materials such as resin so as to be formed relatively easily and formed into an approximately flat shape as a whole thereof. The bracket body C11 is located along the inner surface 510a of the front windshield 510. As shown in FIG. 12, the bracket body C11 accepts fixedly the plurality of loading pads C12 in a fitting manner. The respective loading pads C12 are fixedly adhesive-bonded to the inner surface 510a of the front windshield 510, the frontal camera unit 20 can be loaded to the front windshield 510 and positioned in the interior of the vehicle 500.

The camera casing C20 includes a pair of casing members C21 and C22. The casing members C21 and C22 are made of hard material of relatively higher exoergic performance, for example, aluminum and formed to have a hollow therein.

The casing member C21 is an inverted cup-shaped casing member, provided as a part located at an under portion of the basket assembly C10, and an opening opened downward oppositely to the bracket assembly C10. The upper casing member C21 is fixed to the bracket main body C11, so that the camera casing C20 is positioned along the front windshield 510 inside the vehicle interior via the bracket assembly C10. Between the upper casing member C21 and the front windshield 510, there is formed a recess C212 in which the hood C40 is contained.

The casing member C22 is a dish-shaped lower casing member, located under the upper casing member C21, and is formed to have an opening upward to the upper casing member C21. The lower casing member C22 is connected to the upper casing member C21 using screws. The casing members C21 and C22 cooperatively form a space in which the lens unit C30 and the imaging system C50 are contained.

Figure 14:
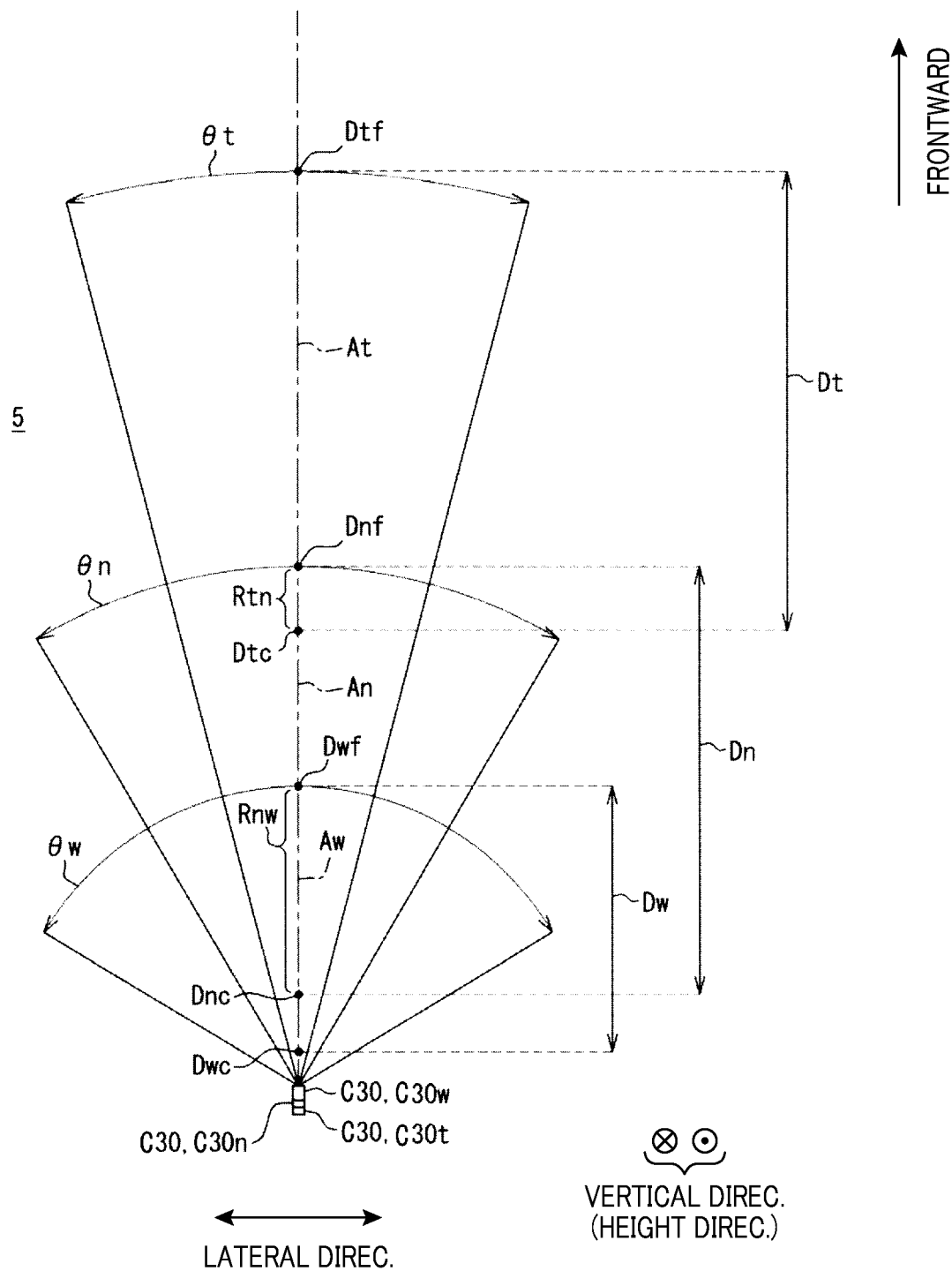
FIG. 14 is a pictorial illustration explaining imaging ranges of respective lens units mounted in the first camera, the imaging ranges being shown as plan views thereof.

The plurality of lens units C30 are three in number in the present embodiment and contained in a containing space C25 of the camera casing C20. As shown in FIGS. 12 and 13, each of the lens units C30 has a front end extended outward from the camera casing C20 via a common lens window C211 which passes a longitudinal wall C210 of the upper casing member C21. The respective lens units C30 have light axes Aw, An and At which are shifted from each other in the vertical direction, and as showing in FIG. 14, are given angle of views Bw, Bn, and Bt whose fields of view are different in angles and lengths from each other. Hence, light images in the mutually-different angle of views Bw, Bn, and Bt enter the respective lens units C30, zone by zone, from the external field 5.

As shown in FIGS. 12 and 13, the hood C40 is united with the bracket main body C11 by using resin molding, for example, and provided as a part of the bracket assembly C10. When viewing the upper face of the hood C40, the hood has a dish-shaped form which is symmetric in shape in the lateral (vehicle width) direction about the light axes Aw, An and At of the lens units C30. The hood C40 has a base wall C41 and side walls C43.

As shown in FIG. 12, the base wall C41 is contained in the containing recess C212 between the upper casing member C21 and the front windshield 510. The base wall C41 is arranged to have an attitude which comes closer to the front windshield 510 as advancing frontward. As shown in FIGS. 12 and 13, the base wall C41 has a bottom wall surface C41a extends in an approximately flat shape which is opposed to the inner surface 51a of the front windshield 510 via an imaging space C410 through which the light axes Aw, An and At pass. Light images originated from imaging target ranges created by the imaging system C50 in the external field 5 pass the front windshield 510, and enter the respective lens units C30 through the imaging space C410.

The side walls C43 are positioned to be symmetric about the light axes Aw, An and At in the lateral (vehicle width) direction such that the side walls C410 draw both sides of the imaging space C410. The respective side walls C43 are built to start from, respectively, both frontal and side corners of the base wall C41 and to increase their height gradually and straight from the base wall C41 as advancing rearward, so that the side walls C43 are formed as slabs. A distance between both the side walls C43 extends gradually as advancing frontward, in the lateral direction. The side walls C43 are connected by a rear wall in a rear position. Via this rear wall, the frontal end portions of the lens units C30 are exposed to the imaging space C410, as shown in FIG. 13. As a result, as shown in FIG. 12, the side walls C43 are located in front of the inner surface 510a of the front windshield 510 to have a gap C430 to the inner surface 510a in the front-back direction of the vehicle.

The hood C40 forms the imaging space C410 which depend on the angle of views θw, θn, and θt (refer to FIG. 14), whereby light images are allowed to enter to the lens units C30 from the imaging target zones in the external field 5. In addition, the hood 40 provides the imaging space C410 in such a manner that excess incident light, such as light reflected from the inner surface 510a of the front windshield 510, can be cut, thereby allowing the food C40 to pass only light from the imaging target zones in the external field 5.

The imaging system C50 is provided with a plurality of imager units C51 each having a control board C54 and a control circuit C55. These components C51, C54 and C55 are arranged in the containing space C25 of the camera casing C20. The control circuits C55 functionally realize the object identifying apparatuses 200 and 210 in the foregoing embodiments.

The plurality of imager units C51 (three units in the embodiments) are located to be behind the respective lens units C30, as shown in FIG. 12, and shifted from each other in the front-back direction such that such sifted positions produce the mutually different angles of view θw, θn, and θt depending on the focal distances of the respective lens units C30. Each of the imager units C51 is provided with an imaging substrate C510, an imaging element C511, and an imaging circuit C512. The imaging element C511 is composed of, for example, a color or monochromatic imager which uses CCDs or CMOSs, and mounted on the imaging substrate C510. Actually the imaging element C511 has a plurality of imaging pixels mapped in a matrix form provided in both longitudinal and lateral directions (i.e., up-down and left-right directions) corresponding to vertical and horizontal directions of the vehicle 500 set on the horizontal plane. Further, the imaging circuit C512 includes a plurality of circuit elements capable of processing an output signal from the imaging element C511, and such circuit elements are mounted on the imaging substrate.

In each of the imager units C51, light images transmitted through the front windshield 510 from the external field 5 are allowed to pass through a corresponding lens unit C30 and focused onto the imaging element C511. Hence, the focused light images are captured as electrical signals by the imaging element C511, and the captured electrical signals or data are provided to the imaging circuit C512 for processing therefor.

The control board C54 is positioned between both the casing members C21 and C22. On the control board C54, an external connector C542 is mounted to be exposed outside the camera casing C20. The external connector C542 is electrically and communicably connected to external circuits, including the main control unit 100, placed outside the camera casing C20. The external connector C542 is mounted on a protruded substrate portion C543 of the control board, in which the protruded substrate portion C543 is formed to protrude rearward more than a rear-side edge C544 of the control board C54.

The control circuit C55 is composed of a plurality of electrical circuit elements including a microcomputer C550 which are mounted on the control board C54. The control circuit C55 is electrically connected to the imaging circuit C512 of each of the imager units C51 via a flexible printed circuit board (FPC) C540. The control board C54 has un upper and lower surfaces and through-holes C541 connecting both of the upper and lower surfaces. The respective FPCs C540 connected to the imaging circuits C512 of the imager units C51 on the upper surface of the control board C54 are made to pass through the through-holes C541, respectively, and are connected to the control board C54 on the lower surface.

With the aid of the imaging circuits C512 of the respective imager units C51, the control circuit C55 is configured to control imaging operations of the imaging elements C511 of the respective imager units C51. The imaging operations include exposure control for imaging. Further, with the aid of the imaging circuits C512 of the respective imager units C51, the control circuit C55 is configured to perform an imaging process to the electrical signals or data outputted from the imaging elements C511 of the respective imager units C51. Such imaging and image processing functions provide imaging results of the respective lens units C30. The imaging results are images of the designated areas of the external field 5, which are captured from the angle of views θw, θn, and θt of the respective lens units C30 (refer to FIG. 14). Of the foregoing imaging and image processing functions, any one function or both functions can be controlled by only the control circuit C55 or by only the imaging circuit C512 of each of the imager units C51.

The control circuit C55 is also able to have an identification function to identify objects reflected in captured images of the external field. This object identification function is realized by the control circuit C55 which performs correction, such as an alignment process. Practically, as shown in FIG. 16, among the produced images of the external field from the respective lens units C30, there are designated pixels indicating the same coordinate points Pw, Pn and Pt. Shifted amounts of such coordinate points from the light axes Aw, An and At are corrected by the control circuit C55. More practically, when such coordinate points Pw, Pn and Pt are calculated as, for example, vanishing points and positional shifts of such vanishing points to the light axes Aw, An and At are detected in at least one of the vertical or lateral directions, the correction is performed.

Each of the lens units C30 will now be detailed in their structures.

Figure 15:
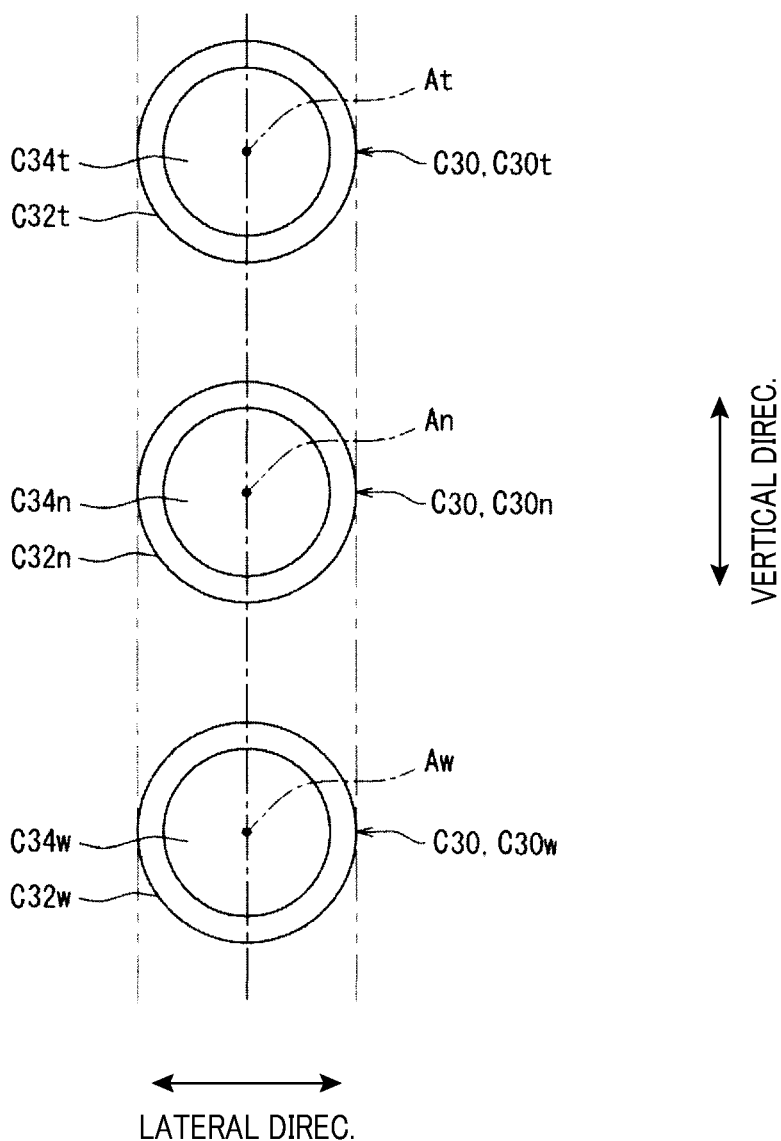
FIG. 15 is a front view exemplifying a positional arrangement of the lens units of the first camera.

As shown in FIGS. 12, 13 and 15, a wide-angle unit C30w, which is one of the lens units C30, is provided with a wide-angle lens tube C32w and a wide-angle lens C34w. The wide-angle lens tube C32w is made of hard materials which can be molded relatively easily, such as resin, and is formed to have a bore therein. The wide-angle lens tube C32w is fixed to the upper casing member C21 by screws or adhesive. The wide-angle lens C34w is made of light-transmissive materials such as glass and is formed into a concave meniscus lens shape. The wide-angle lens C34w is contained in the wide-lens tube C32w, together with a lens set (not shown) located after this lens, in which the lens set is for correcting optical aberration such as color aberration. The wide-angle lens tube C32w is positioned such that the inner surface 510a is separated by a preset distance from the wide-angle lens C34w, which composes the frontal end portion of the wide-angle unit C30w.

As shown in FIGS. 12, 14 and 15, the light axis Aw of the wide-angle unit 30w is set to expand obliquely upward or downward as advancing forward in the front-back direction or expand along the front-back direction. The angle of view θw of the wide-angle unit 30w, shown in FIG. 14, is set at, for example, 120 degrees or thereabouts which is relatively wider, due to use of the wide-angle lens C34w. However, this angle value is not limited to such an example, and may be set more wider. Employment of the wide-angle lens C34w enables the wide-angle unit C30w to have the angle of view θw given a depth of field Dw. This depth of field Dw is limited to be within a predetermined range between a near point Dwc located near side to the driver on the vehicle 500 and a far point Dwf located far side from the driver in the external field 5.

As shown in FIGS. 12, 13 and 15, the lens unit C30 has another unit, which is a narrow-angle unit C30 provided with a narrow-angle lens tube C32n and a narrow-angle lens C34n. The narrow-angle lens tube C32n is made of hard materials which can be molded relatively easily, such as resin, and is formed to have a bore therein. The narrow-angel lens tube C32n is fixed to the upper casing member C21 by screws or adhesive. The narrow-angle lens C34n is made of light-transmissive materials such as glass and is formed into a concave meniscus lens shape. The narrow-angle lens C34n is contained in the narrow-lens tube C32n, together with a lens set (not shown) located after this lens, in which the lens set is for correcting optical aberration such as color aberration.

The narrow-angle lens tube C32n is positioned such that a narrow-angel lens C34n composing the frontal end portion of the narrow-angle unit C30n is arranged above the wide-angle lens C34w without any substantial positional shifts from the wide-angle lens C34w in the front-back and lateral directions in front of the lens set in the plan view. By this arrangement, the wide-angle unit C30w is prevented from protruding, substantially, than a special position corresponding to the above narrow-angle unit C30n of the above-arranged narrow-angle unit C30n in the depth direction, that is, in the frontward direction in the vehicle 500 in the plan view thereof.

As shown in FIGS. 12, 14 and 15, the light axis An of the narrow-angle unit 30n is set to expand obliquely upward or downward as advancing forward in the front-back direction or expand along the front-back direction. The light axis An is also positioned directly above from the light axis Aw of the wide-angle unit C30w, that is, eccentrically positioned only in the vertical direction, so that the position of the light axis An agrees with the light axis Aw in the lateral direction of the vehicle 500.

As shown in FIG. 14, employment of the narrow-angle lens C34n makes it possible that the narrow-angle unit C30n has an angle of view θn which is narrower than the angle of view θw of the wide-angle unit C30w, which is for example 60 degrees or thereabouts, which is categorized in an intermediate angle range. Hence, both angles of view, θn and θw, of both the narrow-angle and wide-angle units C30n and C30w are mutually overlapped on one the other in the plan view of the vehicle 500. Employment of the narrow-angle lens C34n enables the narrow-angle unit C30n to have the angle of view θn given a depth of field Dn. This depth of field Dn is limited to be within a predetermined range between a near point Dnc located near side to the vehicle 500 and a far point Dnf located far side from the driver in the external field 5.

The far point Dwf of the wide-angle unit C30w is set at a position which is farther than the near point Dnc of the narrow-angle unit C30 in the depth direction in the plan view. The near point Dnc of the narrow-angle unit C30n is set at a position which is farther than the near point Dwc of the wide-angle unit C30w in the depth direction in the plan view. Moreover, the far point Dnf of the narrow-angle unit C30n is set at a position which is farther than the far point Dwf of the wide-angle unit C30w in the depth direction in the plan view. By this setting of the far and near points, the far point Dwf of the wide-angle unit C30w is obliged to be located between the near point Dnc and the far point Dnf of the narrow-angle unit C30n. This positional relationship can provide a mutually overlapped range Rnw between the depths of field, Dn and Dw, of the units C30n and C30w.

As shown in FIGS. 12, 13 and 15, the lens units C30 includes anther lens unit provided as a telescopic unit C30t provided with a telescopic lens tube C32t and a telescopic lens C34t. The telescopic lens tube C32t is made of hard materials which can be molded relatively easily, such as resin, and is formed to have a bore therein. The telescopic lens tube C32t is fixed to the upper casing member C21 by screws or adhesive. The telescopic lens C34t is made of light-transmissive materials such as glass and is formed into a concave lens shape. The telescopic lens C34t is contained in the telescopic tube C32t, together with a lens set (not shown) located after this lens, in which the lens set is for correcting optical aberration such as color aberration.

The telescopic lens tube C32t is positioned such that the telescopic lens C34t composing the frontal end portion of the telescopic unit C30t is arranged above the narrow-angle lens C34n without any substantial positional shifts from the narrow-angle lens C34n in the front-back and lateral directions in front of the lens set in the plan view. By this arrangement, the narrow-angle unit C30n is prevented from jettying, substantially, than a special position corresponding to the above telescopic unit C30t of in the depth direction, that is, in the frontward direction in the vehicle 500 in the plan view, and the wide-angle unit C30w is also prevented from jettying, substantially, than the spatial position corresponding to the above telescopic unit C30t in the depth direction when being seen in the plan view.

As shown in FIGS. 12, 14 and 16, the light axis At of the telescopic unit 30t is set to expand obliquely upward or downward as advancing forward in the front-back direction or expand along the front-back direction. The light axis At is also positioned directly above from the light axes Aw and An of the wide-angle and narrow-angle units C30w and C30n, that is, eccentrically positioned only in the vertical direction, so that the position of the light axis At agrees with the light axes Aw and At in the lateral direction of the vehicle 500.

As shown in FIG. 14, employment of the telescopic lens C34t makes it possible that the telescopic unit C30t has an angle of view θt which is narrower than the angles of view θw and θn of the wide-angle and narrow-angle units C30w and C30n, which is for example 35 degrees or thereabouts, which is categorized in a smaller angle range.

Hence, both angles of view, θt and θn, of both the telescopic and narrow-angle units C30t and C30n are mutually overlapped on one the other in the plan view of the vehicle 500. This overlapping structure is true of both angles of view, θt and θw, of both the telescopic and wide-angle units C30t and C30w. Employment of the telescopic lens C34t enables the telescopic unit C30t to have the angle of view θt given a depth of field Dt. This depth of field Dt is limited to be within a predetermined range between a near point Dtc located near side to the vehicle 500 and a far point Dtf located far side from the driver in the external field 5.

In the present embodiment, the far point Dnt of the narrow-angle unit C30n is set farther than the near point Dtc of the telescopic unit C30t when viewed from the vehicle 500 in the depth direction. In addition, the near point Dtc of the telescopic unit C30t is set farther than both of the near points Dnc and Dwf of the narrow-angle and wide-angle units C30n and C30w when viewed from the vehicle 500 in the depth direction. The far point Dtf of the telescopic unit C30t is also set farther than the far points Dnf and Dwf of the narrow-angel and wide-angle units C30n and C30w when viewed from the vehicle 500 in the depth direction.

Hence, by setting the far and near points, the far point Dnt of the narrow-angle unit C30n can be positioned between the near and far points Dtc and Dtf of the telescopic unit C30t, thereby providing a mutually-overlapped range Rtn of the depths of field Dt and Dn of the units C30t and C30n.

In the present embodiment, however, the far point Dwt of the wide-angle unit C30w is removed from a range formed between the near point Dtc and far point Dtf of the telescopic unit C30t. As a result, both the depths of field Dt and Dw of those units C30t and C30w are not overlapped on one the other.

As described, of the mutually different angles of view θw, θn and θt which are set about the mutually, vertically shifted light axes Aw, An and At, first to fourth featured sets of lens units C30 are configured so that at least two angles of view are overlapped with each other.

In the first to fourth featured sets of lens units C30, the lens units are arranged to be overlapped on one another in the vertical direction of the vehicle 500. Hence, at least each set of two light axes becomes closer to each other in the lateral direction of the vehicle 500. As exemplarily illustrated in FIG. 16, the respective lens units C30 each composing the first to fourth featured sets are able to produce individual external images, in which the same points Pw, Pn and Pt are imaged whose pixel positional coordinates correspond to the light axes Aw, An and At, but there is no large positional shift in the lateral direction.

Hence, by acquiring external images using the first to third featured sets of lens units C30, accuracy of image positions in the lateral direction can be raised. The first to third featured sets of lens units C30 will be detailed in a later-described embodiment.

<Second Exemplary Configuration>

Figure 17:
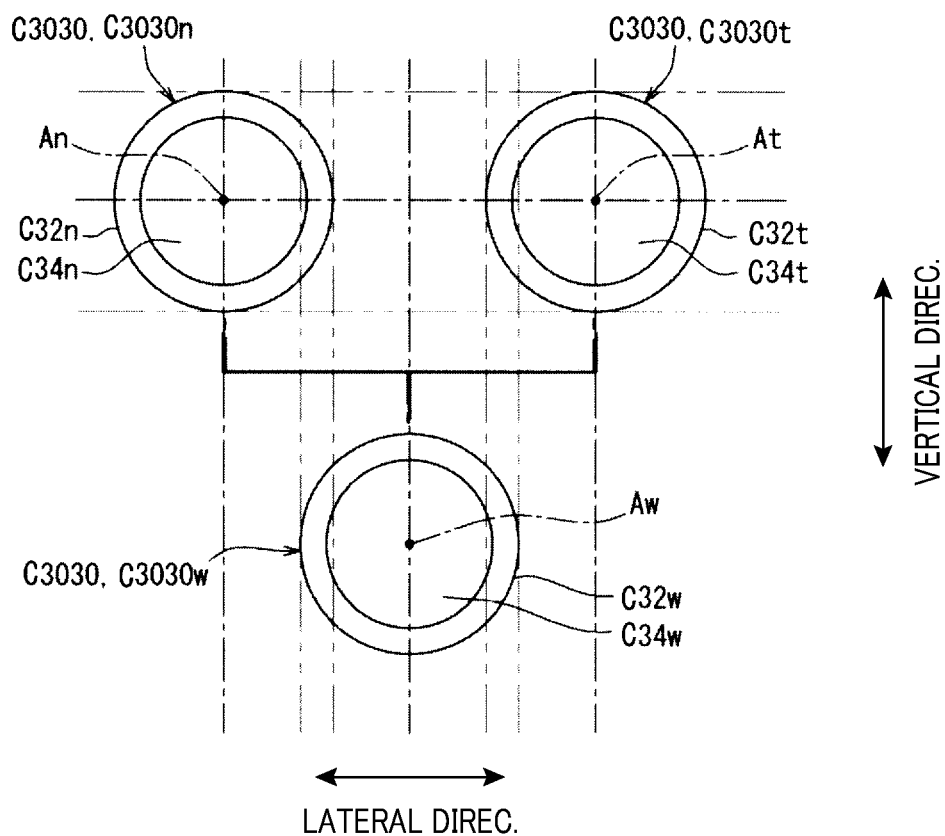
FIG. 17 is a front view exemplifying a positional arrangement of lens units of a second camera.

FIG. 17 shows a second exemplary configuration, in which a narrow-angle unit C3030n has a frontal end portion composed of the narrow-angle lens C34n. This narrow-angle lens C34n may be arranged over the wide-angle lens C34w composing a frontal end portion of the wide-angle unit C3030w, with almost no positional shift in the front-back direction but with a positional shift toward one lateral side of the wide-angle lens C34w in the lateral direction (in the geometry of FIG. 17, shifted toward the left side).

The narrow-angle unit C3030n has a light axis An which is deviated from a light axis Aw of the wide-angle unit C3030w in both the vertical and lateral directions. Thus the wide-angle unit C3030w can be prevented from protruding in the depth direction than the positions of the upper-positioned narrow-angle unit C3030n.

As shown in FIG. 17, in the same manner as the above, a telescopic unit C3030t has a frontal end portion composed of the telescopic lens C34t. This telescopic lens C34t may be arranged over the wide-angle lens C34w, with almost no positional shift in the front-back direction but with a positional shift toward the other lateral side of the wide-angle lens C34w in the lateral direction (in the geometry of FIG. 17, shifted toward the right side).

The telescopic unit C3030t has a light axis At which is deviated from the light axis Aw of the wide-angle unit C3030w in both the vertical and lateral directions. Additionally, the light axis At is deviated from the light axes An of the narrow-angle unit C3030n in only the lateral direction, so that both vertical positions of the light axes At and An are adjusted to be equal to each other. Thus the wide-angle unit C3030w can be prevented from protruding in the depth direction than the positions of the upper and lateral positioned telescopic unit C3030t and narrow-angle unit C3030n.

In the arrangement shown in FIG. 17, there are plurality of featured sets composed of the lens units C3030, which are provided as a combination of the lens units whose parts are overlapped with each other in either the vertical or lateral direction. These featured sets are three sets in this embodiment. Such featured sets are composed of first and second featured sets made by lens units aligned in the lateral direction and third featured set made by lens units aligned in the vertical direction.

Practically, the first featured set is created by the wide-angle unit C3030w and the narrow-angle unit C3030n which are arranged at the different height and partly-mutually overlapped lateral positions. The second featured set is created by the wide-angle unit C3030w and the telescopic unit C3030t which are also arranged at the different height and partly-mutually overlapped lateral positions. The third featured set is created by the narrow-angle and telescopic units C3030n and C3030t the entire projections of which are overlapped with each other in the vertical direction.

According to the first and second featured sets of the lens units, the partial deviations are provided in the lateral direction by each set of the two-set lens units presetting axes Aw, An and Aw, At. Hence, the lens units C3030 can provide, set by set, external images, whose pixels which capture the same positions Pw, Pn and Pt can be suppressed from being shifted from each other. Therefore, with this suppression, the degree of freedom of arrangement design of the lens units can be secured highly, because it is not necessary to increase the unit sizes, due to without adding therein extra circuitry for the suppression.

Accordingly, it is possible to secure a field of view for the crew in the vehicle in the vertical direction and provide higher accuracy of images in the lateral direction. In particular, the second featured set can provide both the field of view and the higher image accuracy by using the telescopic unit C3030t whose angle of view θt is narrower than the angle of view θw and the wide-angle unit C3030w having such angle of view θw. In this set, the telescopic unit C3030t serves as another narrow-angle unit other than the narrow-angle unit C3030n. Further, the narrow-angle unit C3030n of the featured set and the telescopic unit C3030t of the second featured set can serve as the third featured set, overlapped in the vertical direction, and have the light axes An and At are positionally separated from each other in the lateral direction. Hence, an increase in the vertical unit size, which is due to reduction of image shifts in the lateral direction, can be suppressed and a wider field of view for the occupants can be obtained.

<Third Exemplary Configuration>

Figure 18:
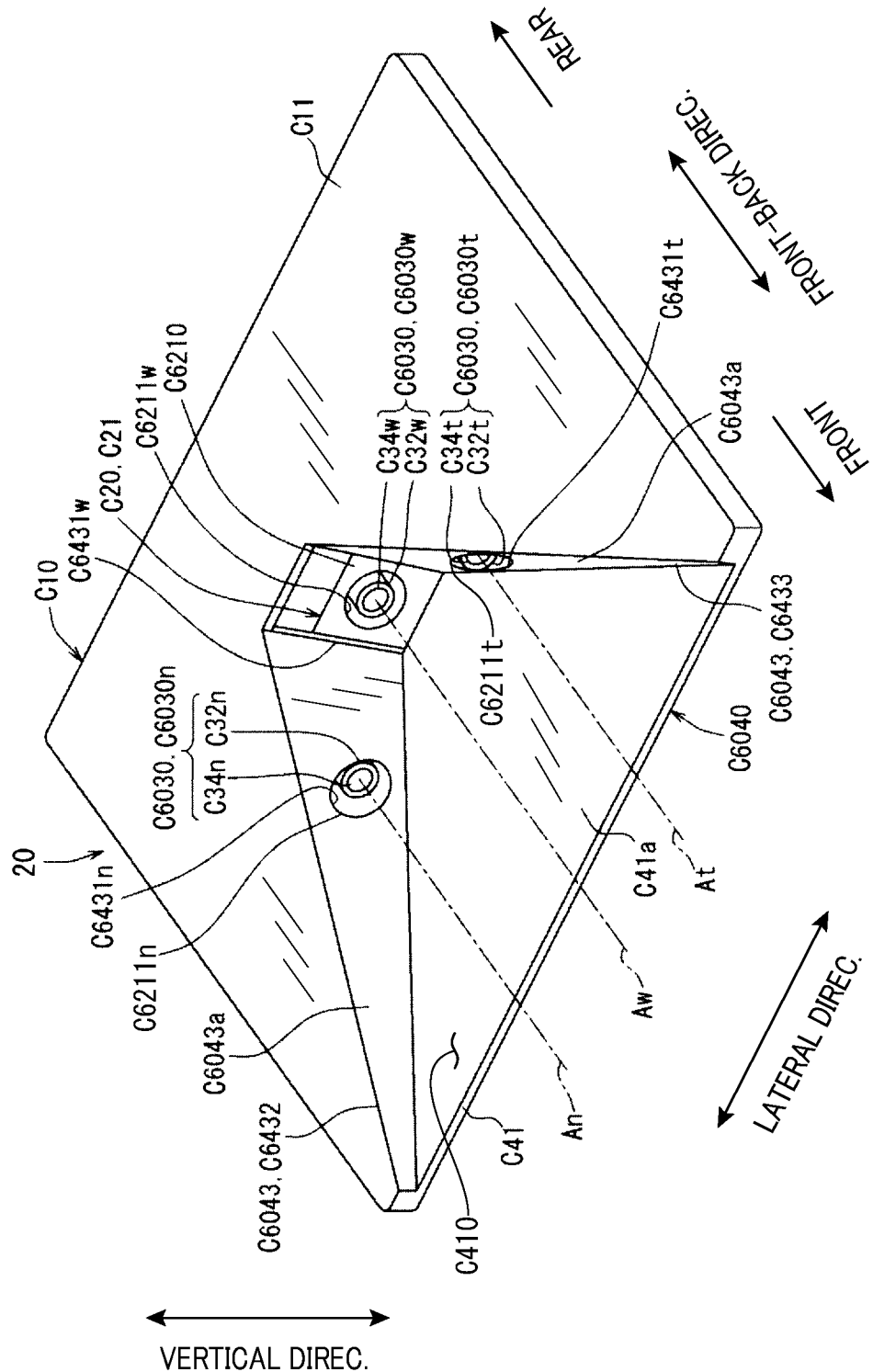
FIG. 18 is a perspective view showing the external configuration of a third camera.

A third exemplary configuration is shown in FIG. 18. In this configuration, there are provided side walls C6043 and lens units C6030 arranged in the lateral direction. The lens units C6030 include a wide-angle unit C6030w located at the center in the lateral direction. The wide-angle unit C6030w has a light axis Aw so that the lens units C6030 are arranged symmetrically about the light axis Aw in the a later direction.

The side walls C6043 are shaped into flat boards and arranged obliquely to the light axis Aw of the wide-angle unit C6030w, so that there is provided an imaging space C410 in front of the wide-angle unit C6030w. The imaging space C410 becomes wider with increasing distance from the vehicle.

Figure 19:
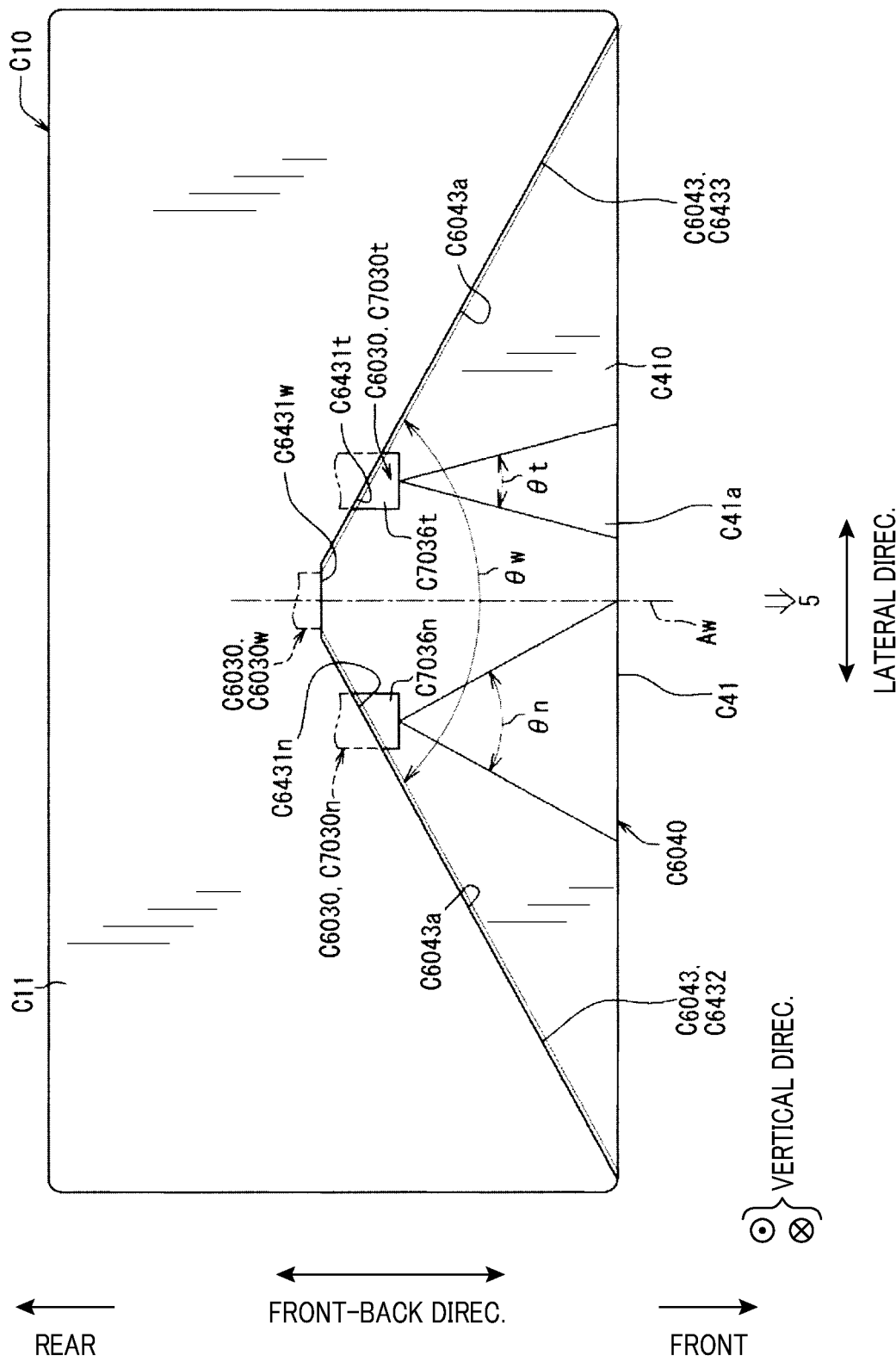
FIG. 19 is a plan view showing the food of the third camera.

Practically, the side walls C6043 have trapezoidal inner wall surfaces C6043a, which are formed to spread outside, but along outer boundaries defining the angle of view θw, as shown in a plan view shown in FIG. 19. The lens units still include a narrow-angle unit C6030n and a telescopic unit C6030t respectively having angles of view θn and θt which are narrower than the angle of view θw. Such angles of view θn and θt are partially present within in the imaging space C410, that is, within the imaging angle range defined by the angle θw, in the plan view, as shown in FIG. 19.

As shown in FIGS. 18 and 19, there is provided a longitudinal wall C6210 tightly adjacent to rear-side ends of the side walls C6043. The longitudinal wall C6210 has a lens window C6211w. A wide-angle exposure window C6431w is opened on the front side of the lens window C6211w. The frontal end portion of the wide-angle unit C6030w is positioned to enter the wide-angle exposure window C6431w from the lens window C6211w, but not in the imaging space C410. Hence, the wide-angle exposure window C6431w allows the wide-angle unit C6030w to be exposed to the imaging space C410.

The side walls C6043 include first and second side walls C6432 and C6433 arranged in the lateral direction. In the first side wall C6432, there is formed a narrow-angle exposure window C6431n which is opened on the front side of the lens window C6211w of the longitudinal wall C6210. The narrow-angle exposure window C6431n is positioned to be equal to the wide-angle exposure window C6431w in the vertical, i.e., height direction. The narrow-angle unit C6030n has a frontal end portion is positioned to enter the narrow-angle exposure window C6431n from a lens window C6211n, but not in the imaging space C410. Hence, the narrow-angle exposure window C6431n allows the narrow-angle unit C6030n to be exposed to the imaging space C410.

The second side wall C6433 has a telescopic exposure window C6431t opened on the lens window C6211w of the longitudinal wall C6210. The telescopic exposure window C6431t is positioned to be equal to the wide-angle and narrow-angle exposure windows C6431w and C6431n in the vertical, i.e., height direction.

In addition, the telescopic exposure window C6431t is positionally shifted from the wide exposure window C6431w in the front-back direction but is positionally equal to the narrow-angle exposure window C6431n in the front-back direction. The telescopic unit C6030t has a frontal end portion is positioned to enter the exposure window C6431t from a lens window C6211t, but not in the imaging space C410. Hence, the telescopic exposure window C6431t allows the telescopic unit C6030t to be exposed to the imaging space C410 such that the telescopic unit C6030t is positioned on the front side of the wide-angle unit C6030w and is almost directly opposed to the narrow-angle unit C6030n.

Figure 20:
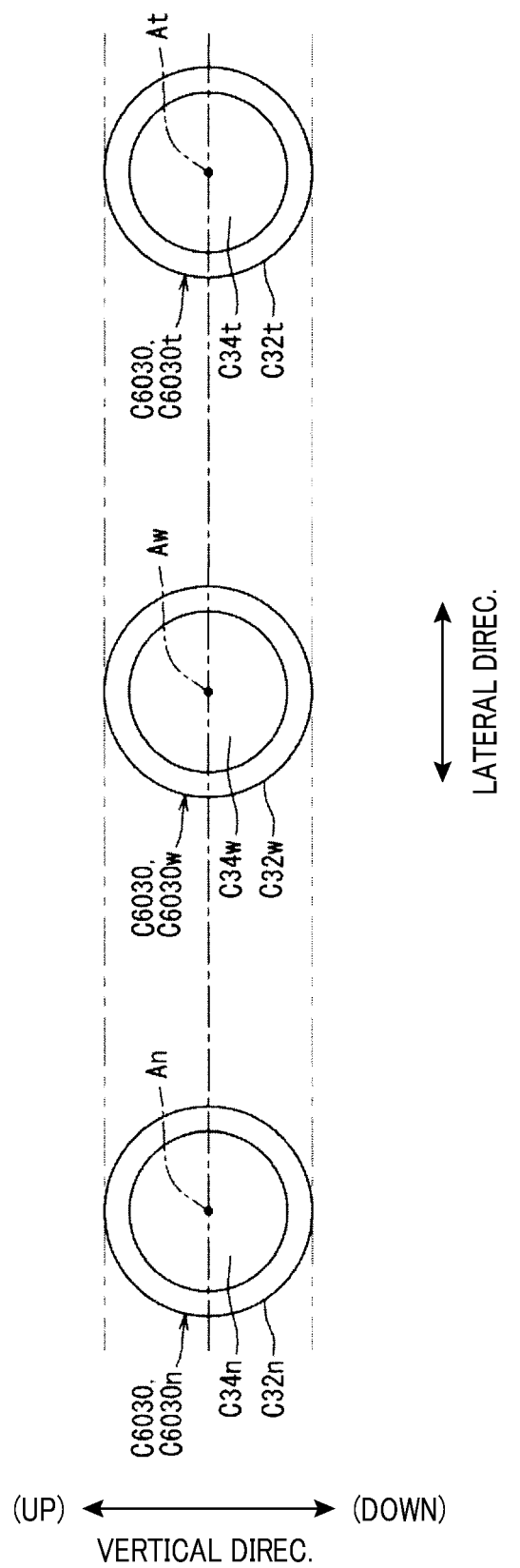
FIG. 20 is a front view exemplifying a positional arrangement of the lens units of the third camera.

As shown in FIG. 20, the frontal end portion (i.e., the narrow-angle lens C34n) of the narrow-angle unit C6030n and the frontal end portion (i.e., the wide-angle lens C34w) of the wide-angle unit C6030w are arranged without a substantial shift in the vertical direction, i.e., the vehicle height direction, only separated from each other in the lateral and frontward directions The light axis An of the narrow-angel unit C6030n is positionally separated from the light axis Aw of the wide-angle unit C6030w only in the lateral direction. The frontal end portion (i.e., the telescopic lens C34t) of the telescopic unit C6030t and the frontal end portion (i.e., the wide-angle lens C34w) of the wide-angle unit C6030w are arranged without a substantial shift in the vertical direction, i.e., the vehicle height direction, only separated from each other in the lateral and frontward directions. The light axis At of the telescopic unit C6030t is positionally separated from both the light axes Aw and An in only the lateral direction.

In the third exemplary configuration, the camera casing is provided with the upper casing member C21 with the longitudinal wall C6210. This wall C6210 is formed to allow the foregoing positional shifts of the lens units C6030w, C6030n and C6030t in the front-back direction. Practically, the side walls C6340 located adjacently to the longitudinal wall C6210 obliquely extend forward the front side to provide a gradually extended viewing area when viewing the plan view.

The lens windows C6211w, C6211n and C6211t for the lens units C6030w, C6030n C6030t in the longitudinal wall C6210 and the side walls C6340 are formed unit by unit. Vertical positions of the individual lens windows C6211w, C6211n and C6211t are mutually matched with each other. In addition, positions of the lens windows C6211n and C6211t are positionally shifted from the lens window C6211w in the front-back direction.

<Fourth Exemplary Configuration>

Figure 21:
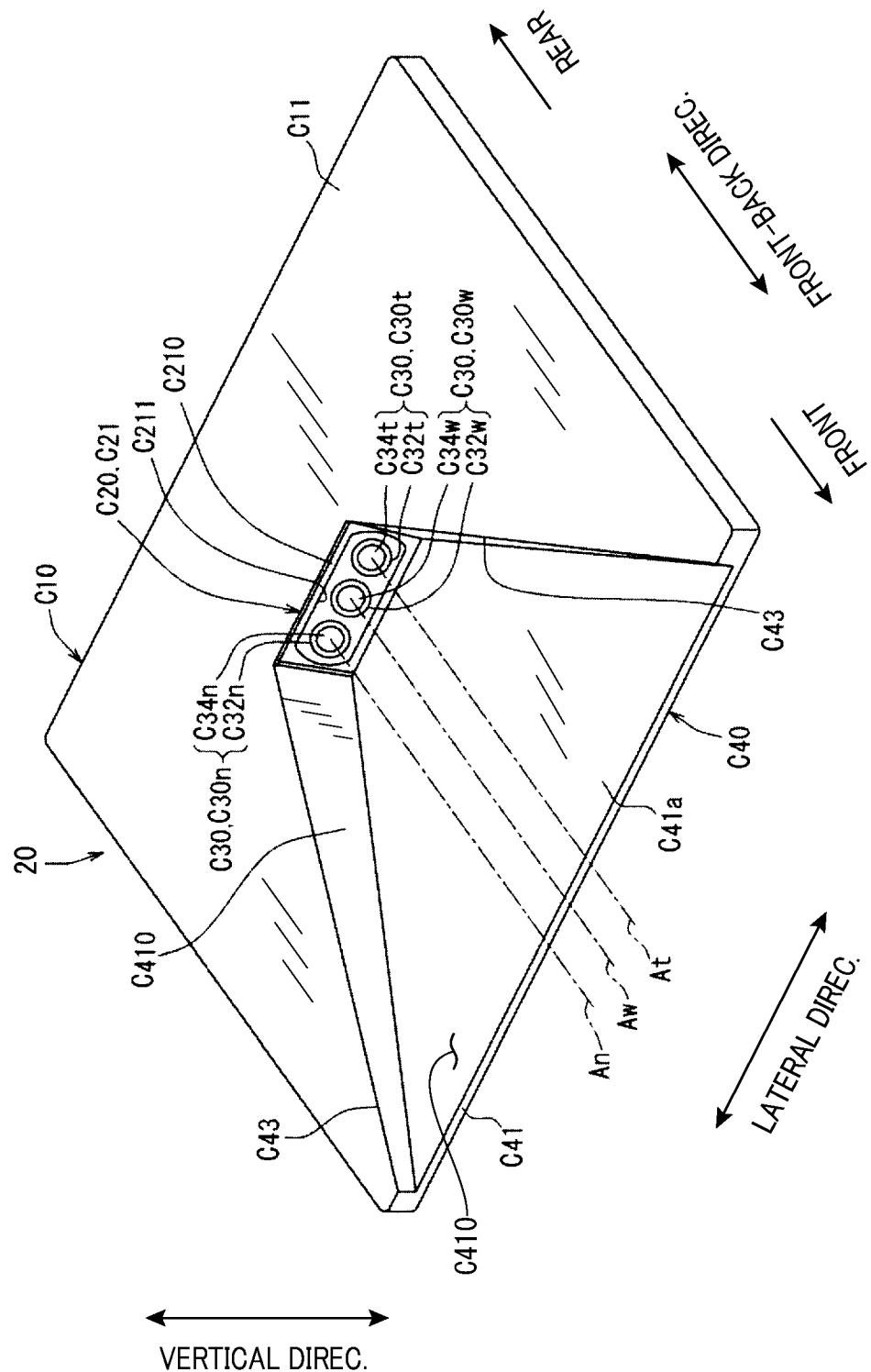
FIG. 21 is a perspective view showing the external configuration of a fourth camera.

A fourth exemplary configuration is shown in FIG. 21, in which the lens units C30w, C30n and C30t have the light axes Aw, An and At which are shifted from each other in only the lateral direction, which allows the lens units to be arranged in sequence in the lateral direction.

In this configuration, the same advantageous effects can be obtained and, in addition to those, lateral positional accuracy for acquired images can be secured due to distortion correction of the positional coordinates of the images.

<Fifth to Seventh Exemplary Configurations>

Figure 22:
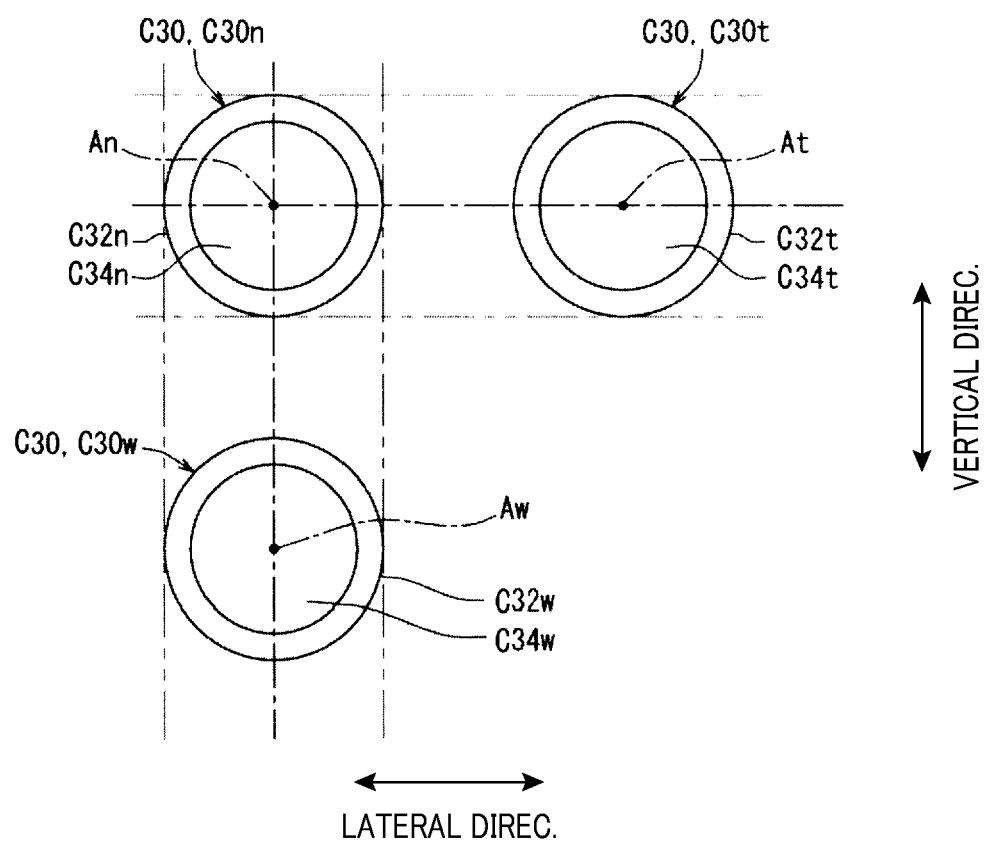
FIG. 22 is a front view exemplifying a positional arrangement of the lens units of a fifth camera.
Figure 23:
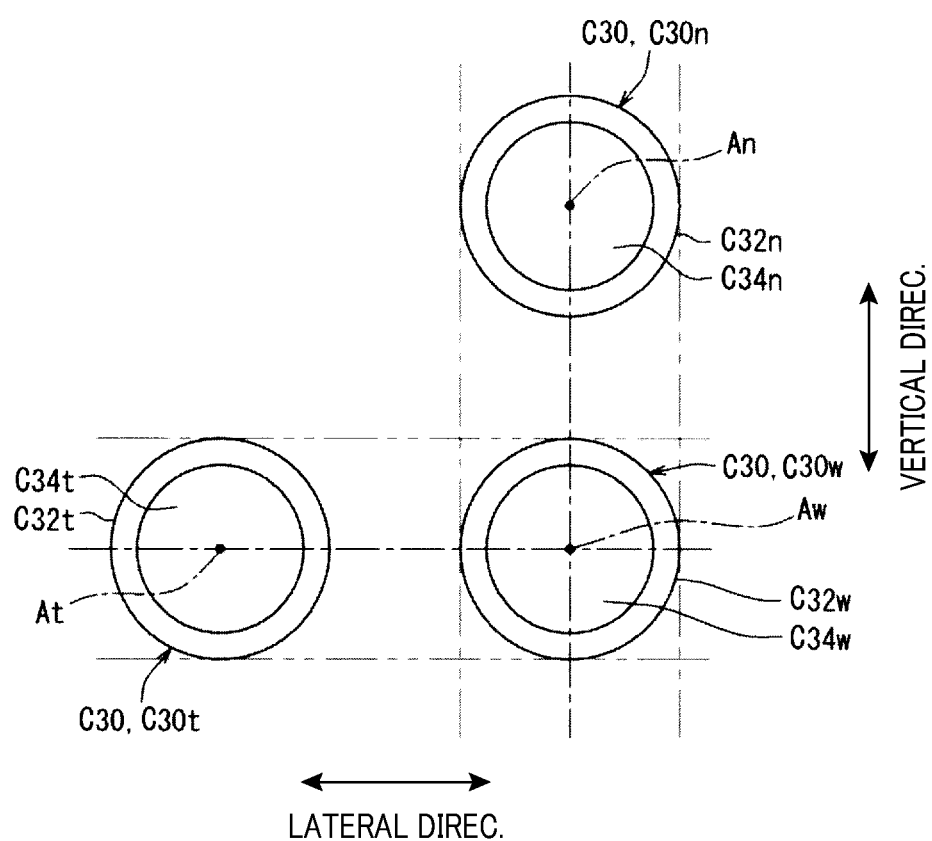
FIG. 23 is a front view exemplifying a positional arrangement of the lens units of a sixth camera.
Figure 24:
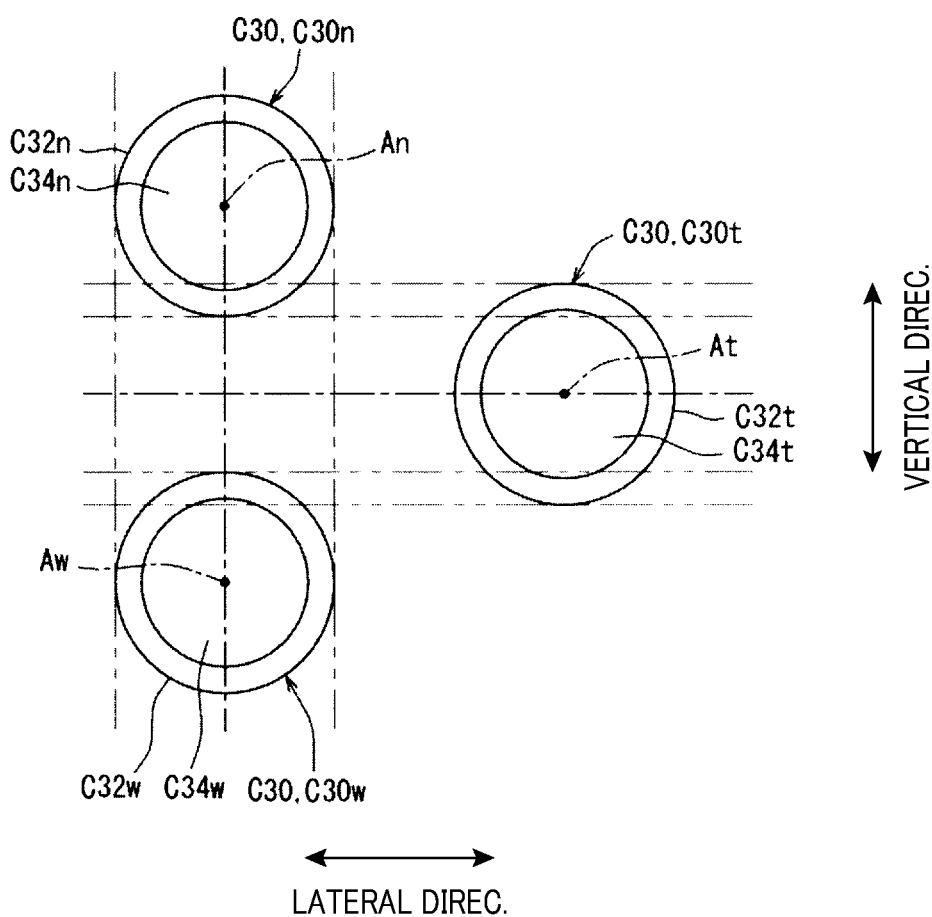
FIG. 24 is a front view exemplifying a positional arrangement of the lens units of a seventh camera.

Fifth to seventh exemplary configurations are shown in FIGS. 22 to 24, respectively.

In these configurations, the telescopic unit C30t is arranged at a position other than positions which are above the narrow-angle unit C30n. Practically, in FIGS. 22 to 24, the telescopic unit C30t is arranged on one lateral side of one or two of the wide-angle unit C30w and the narrow-angle unit C30n. This arrangement enables the telescopic unit C30t to be overlapped with one or two of the wide-angle unit C30w and the narrow-angle unit C30n when seeing in the vertical direction.

The present disclosure has been explained based on various embodiments and modifications, but not be limited to those explained structures. A plurality of functions of one component in the embodiments described above may be implemented by a plurality of components, or one function of one component may be implemented by a plurality of components. Furthermore, a plurality of functions of a plurality of components may be implemented by one component, or one function implemented by a plurality of components may be implemented by one component. Furthermore, part of the configurations of the embodiments set forth above may be omitted. Furthermore, at least part of the configuration of an embodiment set forth above may be added to or replaced by the configuration of another embodiment set forth above. It should be noted that all the modes encompassed by the technical idea that is specified by the language of the claims should be the embodiments of the present disclosure.

Application Examples

When the imaging system mounted in a vehicle according the first embodiment is provided as an application example 1 of which basic structure can be summarized as below, various other application examples can be provided.

Application example 1 is provided as an imaging system (30, 31) to be mounted in a vehicle, comprising:

an optical wide-angle camera (20a, 20b) acquiring an image (WI); and an object identifying apparatus (20, 21) configured to execute a distortion correcting process with the acquired image and apply previously-prepared reference patterns (RP1, RP2) to the image which has been subjected to the distortion correcting process such that objects in the acquired image are recognized.

Application example 2 is provided as the imaging system of application example 1, wherein the reference pattern includes a first reference (RP1) directed to the image acquired by the wide-angle camera, and the object identifying apparatus is configured to i) apply a distortion correcting process to an entire area of the acquired image, the distortion correcting process being for correcting distortion caused due to imaging of the wide-angle camera, and ii) identify an object in the entire area of the acquired image based on the first reference pattern.

Application example 3 is provided as the imaging system of application example 1, wherein the object identifying apparatus is configured to apply a distortion correcting process to an overall area of the acquired image, the distortion correcting process being for correcting distortion of the image acquired from the wide-angle camera to non-wide-angle distortion which is distortion of an image acquired by a non-wide-angle camera, and the reference pattern is a second reference pattern (RP2) assigned to the non-wide-angle distortion, wherein the object identifying apparatus is configured to identify an object in the overall area of the acquired image based on the second reference pattern.

Application example 4 is provided as the imaging system of application example 3, wherein the object identifying apparatus is configured to apply a distortion correcting process to the acquired image from the wide-angle camera, the distortion correcting process being for correcting the distortion of the acquired image to a maximum distortion level of the non-wide-angle distortion.

Application example 5 is provided as the imaging system of application example 3, wherein the reference pattern includes a first reference pattern (RP1) directed to correction of distortion in the image acquired from the wide-angle camera and a second reference pattern (RP2) directed to correction of distortion in the image acquired from a non-wide-angle camera; and the object identifying apparatus is configured to i) perform the distortion correcting process with a peripheral area (EW1) of the acquired image and stop the distortion correcting process from being performed with other areas (CWC) other than the peripheral area in the acquired image, ii) adopt the second reference pattern to recognize objects in the other areas, and iii) adopt the first reference pattern to recognize an object in the peripheral area.

Application example 6 is provided as the imaging system of application example 3, wherein the non-wide-angle camera is at least one in number thereof, and is provided with, at least, one of a narrow-angle camera (20b) and a telescopic camera (20c).

Application example 7 is provided as the imaging system of application example 1, wherein the reference pattern includes a first reference pattern (RP1) directed to correction of distortion in the image acquired from the wide-angle camera; and the object identifying apparatus is configured to i) perform the distortion correcting process with a surrounding area around an object candidate included in a peripheral area (EW1) of the acquired image and stop the distortion correcting process from being performed with other areas other than the surrounding area in the acquired image, and ii) adopt the first reference pattern to recognize an object in an entire area of the acquired image.

Application example 8 is provided as the imaging system of application example 1, wherein the wide-angle camera includes a central fossa lens, the object identifying apparatus is configured to apply the distortion correcting process to a peripheral area of the acquired image and not to apply the distortion correcting process to another area other than the peripheral area of the acquired image, and the reference pattern includes a first reference pattern (RP1) directed to distortion caused in an image acquired by the wide-angle camera and a second reference pattern (RP2) directed to distortion caused in an image acquired by a non-wide-angle camera, wherein the object identifying apparatus is configured to identify i) an object in the other area based on the second reference pattern and ii) an object in the peripheral area based on the first reference pattern.

Application example 9 is provided as an imaging system (30, 31) being mounted on a vehicle, comprising:

at least one wide-angle camera (20a, 21a); and an object identifying unit (20, 21) configured to divide an image acquired by the wide-angle camera, into a plurality of area images (CA, DA1, DA2) and identify an object in the area images based on the area images and a reference pattern (RP2, DRP) previously set to the respective area images.

Application example 10 is provided as the imaging system of application example 9, wherein the plurality of area images are located in a peripheral area (DA1, DA2) of the acquired image and another area other than the peripheral area of the acquired image, the reference pattern includes a second reference pattern (RP2) directed to distortion caused in the other area and a peripheral area reference pattern (DRP) directed to distortion caused in the other area, and the object identifying apparatus is configured to identify i) an object in the other area based on the second reference pattern and ii) an object in the peripheral area based on the peripheral area reference pattern.

Application example 11 is provided as the imaging system of application example 10, wherein the distortion in the peripheral area is distortion in a peripheral area of an image acquired by the wide-angle camera, the second reference pattern is directed to distortion in an image acquired by a non-wide-angle camera, and the peripheral area reference pattern is directed to distortion in the peripheral area of the image acquired by the wide-angle camera.

Application example 12 is provided as the imaging system of application example 11, wherein the non-wide-angle camera is at least one of a narrow-angle camera (20b) and a telescopic camera (20c).

Application example 13 is provided as the imaging system of any one of application examples 10 to 12, wherein the other area is an area (NI) adapted to an angle of view for the non-wide-angle camera.

Application example 14 is provided as an object identifying apparatus (20, 21), comprising:

an acquisition unit (203, 213) configured to acquire an image (WI) imaged by a wide-angle camera (203, 213); and a recognition unit configured to recognize an object in the image based on a previously set reference pattern (RP1, RP2), wherein the recognition unit is equipped with a recognition section (201, 211, P1, P2) which applies a distortion correcting process to the acquired image and identifies an object in the corrected image.

Application example 15 is provided as the object identifying apparatus of application example 14, wherein the reference pattern is a first reference pattern (RP1) directed to distortion in the image acquired by the wide-angle camera, and the recognition unit is configured to i) apply a distortion correcting process to an entire area of the acquired image, the distortion correcting process correcting distortion caused the wide-angle camera, and ii) identify an object in the entire area of the acquired image based on the first reference pattern.

Application example 16 is provided as the object identifying apparatus of application example 14, wherein the recognition unit is configured to i) apply a distortion correcting process to an entire area of the acquired image, the distortion correcting process being for correcting distortion in the image acquired by the wide-angle camera down to a degree of distortion caused in an image acquired by the non-wide-angle camera, and ii) identify an object in the entire area of the acquired image based on, as the reference pattern, a second reference pattern (RP2) directed to distortion due to imaging of the non-wide-angle camera Application example 17 is provided as the object identifying apparatus of application example 16, wherein the recognition unit is configured to apply another distortion correcting process to the image acquired by the wide-angle camera, the other distortion correcting process being for correcting distortion in the acquired image down to a maximum degree of diction caused in an image acquired by the non-wide-angle camera.

Application example 18 is provided as the object identifying apparatus of application example 14, wherein the reference pattern includes a first reference pattern (RP1) directed to correction of distortion in the image acquired from the wide-angle camera and a second reference pattern (RP2) directed to correction of distortion in an image acquired by a non-wide-angle camera, and the recognition unit is configured to i) apply the distortion correcting process to an only peripheral area (EWI) of the acquired image, the distortion correcting process being not applied to anther area (CWC) other than the peripheral area in the acquired image, ii) identify an object in the other area based on the second reference pattern, and iii) identify an object in the peripheral area based on the first reference pattern.

Application example 19 is provided as the imaging system of any one of application examples 16 to 18, wherein the non-wide-angle camera is at least one of a narrow-angle camera (20b) and a telescopic camera (20c).

Application example 20 is provided as the imaging system of application example 14, wherein the reference pattern includes a first reference pattern directed to correction of distortion in the image acquired from the wide-angle camera; and the recognition unit is configured to i) perform the distortion correcting process with a surrounding area around an object candidate included in a peripheral area (EW1) of the acquired image and stop the distortion correcting process from being performed with other areas other than the surrounding area in the acquired image, and ii) adopt the first reference pattern to recognize an object in an entire area of the acquired image.

Application example 21 is provided as the imaging system of application example 14, wherein the wide-angle camera includes a central fossa lens, the reference pattern includes a first reference pattern (RP1) directed to distortion caused in an image acquired by the wide-angle camera and a second reference pattern (RP2) directed to distortion caused in an image acquired by a non-wide-angle camera, and the recognition unit is configured to i) apply the distortion correcting process to only a peripheral area of the acquired image and not to apply the distortion correcting process to another area other than the peripheral area of the acquired image, ii) identify an object in the other area based on the second reference pattern, and iii) an object in the peripheral area based on the first reference pattern.

Application example 22 is provided as an object identifying apparatus (20, 21), comprising:

an acquisition unit (203, 213) configured to acquire an image imaged by a wide-angle camera; and a recognition unit (201, 211, P1, P2) configured to divide the acquired image into a plurality of area images (CA, DA1, DA2), and identify an object in the plurality of area images based on the plurality of area images and a reference pattern (RP2, DRP) prepared for each of the plurality of area images.

Application example 23 is provided as the imaging system of application example 22, wherein the plurality of area images are located in a peripheral area (DA1, DA2) of the acquired image and another area other than the peripheral area of the acquired image, the reference pattern includes a second reference pattern (RP2) directed to distortion caused in the other area and a peripheral area reference pattern (DRP) directed to distortion caused in the other area, and the object identifying apparatus is configured to identify i) an object in the other area based on the second reference pattern and ii) an object in the peripheral area based on the peripheral area reference pattern.

Application example 24 is provided as the imaging system of application example 23, wherein the distortion in the peripheral area is distortion in a peripheral area of an image acquired by the wide-angle camera, the second reference pattern is directed to distortion in an image acquired by a non-wide-angle camera, and the peripheral area reference pattern is directed to distortion in the peripheral area of the image acquired by the wide-angle camera.

Application example 25 is provided as the imaging system of application example 24, wherein the non-wide-angle camera is at least one of a narrow-angle camera (20b) and a telescopic camera (20c).

Application example 26 is provided as the imaging system of any one of application examples 23 to 25, wherein the other area is an area (EI) adapted to an angle of view for the non-wide-angle camera.

What is claimed is:

1. An imaging system to be mounted in a vehicle, comprising:
    an optical wide-angle camera acquiring an image, the acquired image having wide-angle distortion caused by the wide-angle camera; and
    a control system including a processor for executing instructions that causes the processor to:
        execute a distortion correcting process with the acquired image and apply previously-prepared reference patterns to the image which has been subjected to the distortion correcting process such that objects in the acquired image are recognized, the reference patterns including:
            a first reference pattern directed to correction of wide-angle camera distortion; and
            a second reference pattern directed to correction of non-wide angle camera distortion;
        apply the distortion correcting process to an entire area of the acquired image, the distortion correcting process being for correcting the wide-angle distortion to non-wide-angle distortion associated with a non-wide-angle camera;
        apply the distortion correcting process to a peripheral area of the acquired image and stop the distortion correcting process from being performed with other areas other than the peripheral area in the acquired image;
        adopt the second reference pattern to recognize one or more objects in the other areas; and
        adopt the first reference pattern to recognize an object in the peripheral area.

2. The imaging system of claim 1, wherein:
    the distortion correcting corrects the wide-angle distortion of the acquired image to a maximum distortion level of the non-wide-angle distortion.

3. The imaging system of claim 1, wherein:
    the non-wide-angle camera is at least one in number thereof and is provided with at least one of a narrow-angle camera and a telescopic camera.

4. The imaging system of claim 1, wherein:
    the instructions further cause the processor to:
        perform the distortion correcting process with a surrounding area around an object candidate included in the peripheral area of the acquired image and stop the distortion correcting process from being performed with other areas other than the surrounding area in the acquired image, and
        adopt the first reference pattern to recognize an object in the entire area of the acquired image.

5. The imaging system of claim 1, wherein:
    the wide-angle camera includes a central fossa lens.

6. A control system including a processor for executing instructions that cause the processor to:
    acquire an image imaged by a wide-angle camera, the acquired image having wide-angle distortion caused by the wide-angle camera;
    recognize an object in the image based on previously set reference patterns, the reference patterns including:
        a first reference pattern directed to correction of wide-angle camera distortion; and
        a second reference pattern directed to correction of non-wide angle camera distortion;
    apply the distortion correcting process to an entire area of the acquired image, the distortion correcting process being for correcting the wide-angle distortion to non-wide-angle distortion associated with a non-wide-angle camera;
    apply the distortion correcting process to only a peripheral area of the acquired image, the distortion correcting process is not applied to another area other than the peripheral area in the acquired image,
    identify an object in the other area based on the second reference pattern; and
    identify an object in the peripheral area based on the first reference pattern.

7. The control system of claim 6, wherein:
    the instructions further cause the processor to apply another distortion correcting process to the acquired image, the other distortion correcting process corrects the wide-angle distortion in the acquired image down to a maximum degree of non-wide angle distortion.

8. The control system of claim 6, wherein:
    the non-wide-angle camera is at least one of a narrow-angle camera and a telescopic camera.

9. The control system of claim 6, wherein:
    the instructions further cause the processor to:
        perform the distortion correcting process with a surrounding area around an object candidate included in the peripheral area of the acquired image and stop the distortion correcting process from being performed with other areas other than the surrounding area in the acquired image, and
        adopt the first reference pattern to recognize an object in the entire area of the acquired image.

10. The control system of claim 6, wherein:
    the wide-angle camera includes a central fossa lens.

11. An object recognizing method, comprising:
    acquiring an image imaged by a wide-angle camera that includes a central fossa lens, the acquired image having wide-angle distortion caused by the wide-angle camera;
    applying a distortion correcting process to an entire area of the acquired image, the distortion correcting process being for correcting the wide-angle distortion caused due to imaging of the wide-angle camera;
    applying the distortion correcting process to only a peripheral area of the acquired image and not applying the distortion correcting process to another area other than the peripheral area of the acquired image, identifying an object in the peripheral area based on a first reference pattern, the first reference pattern being directed to correction of wide-angle camera distortion; and identifying an object in the other area based on a second reference pattern, the second reference pattern being directed to correction of non-wide angle camera distortion.

* * * * *